US010261509B2

(12) United States Patent
Horita et al.

(10) Patent No.: US 10,261,509 B2
(45) Date of Patent: Apr. 16, 2019

(54) ON-VEHICLE CONTROL DEVICE, HOST VEHICLE POSITION AND POSTURE SPECIFYING DEVICE, AND ON-VEHICLE DISPLAY DEVICE

(71) Applicant: HITACHI AUTOMOTIVE SYSTEMS, LTD., Hitachinaka-shi, Ibaraki (JP)

(72) Inventors: Yuki Horita, Tokyo (JP); Tatsuaki Osafune, Tokyo (JP); Makoto Kudo, Hitachinaka (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days.

(21) Appl. No.: 15/522,410

(22) PCT Filed: Dec. 9, 2015

(86) PCT No.: PCT/JP2015/084545
§ 371 (c)(1),
(2) Date: Apr. 27, 2017

(87) PCT Pub. No.: WO2016/114044
PCT Pub. Date: Jul. 21, 2016

(65) Prior Publication Data
US 2017/0329328 A1 Nov. 16, 2017

(30) Foreign Application Priority Data

Jan. 14, 2015 (JP) .................................. 2015-005314

(51) Int. Cl.
G05D 1/06 (2006.01)
B60W 50/14 (2012.01)
(Continued)

(52) U.S. Cl.
CPC .......... *G05D 1/0061* (2013.01); *B60R 21/00* (2013.01); *B60W 40/02* (2013.01); *B60W 50/14* (2013.01); *G08G 1/0962* (2013.01); *G08G 1/16* (2013.01)

(58) Field of Classification Search
CPC .... B60W 40/02; B60W 50/14; G05D 1/0061; G08G 1/0962; G08G 1/16
See application file for complete search history.

(56) References Cited

U.S. PATENT DOCUMENTS 6,141,617 A * 10/2000 Matsuda ............ B60K 31/0066
340/438
6,285,923 B1 * 9/2001 Matsuda ............ B60K 31/0058
340/901
(Continued)

FOREIGN PATENT DOCUMENTS

EP 1906376 A2 4/2008
EP 2264404 A2 12/2010
(Continued)

OTHER PUBLICATIONS

International Search Report, PCT/JP2015/084545, dated Mar. 8, 2016, 1 pg.
(Continued)

Primary Examiner — Tyler J Lee
(74) Attorney, Agent, or Firm — Volpe and Koenig, P.C.

(57) ABSTRACT

An on-vehicle control device mounted on a vehicle and controlling traveling of the vehicle includes a vehicle position error specifying unit that estimates a position error of the vehicle, a travel control continuity information determination unit that determines information relating to continuity of a travel control state of the vehicle based on the position error of the vehicle estimated by the vehicle position error specifying unit, and a travel control continuity information output unit that outputs the information relating to the
(Continued)

continuity of the travel control state of the vehicle determined by the travel control continuity information determination unit.

12 Claims, 16 Drawing Sheets

(51) Int. Cl.
*B60R 21/00* (2006.01)
*B60W 40/02* (2006.01)
*G08G 1/16* (2006.01)
*G08G 1/09* (2006.01)
*G05D 1/00* (2006.01)
*G08G 1/0962* (2006.01)

(56) References Cited

U.S. PATENT DOCUMENTS

| | | | | |
|---|---|---|---|---|
| 6,725,145 B1* | 4/2004 | Takahashi | B60K 31/0075 | 340/438 |
| 6,738,705 B2* | 5/2004 | Kojima | B60K 31/0058 | 340/988 |
| 6,778,896 B1* | 8/2004 | Matsuura | B60K 31/0066 | 701/70 |
| 7,433,772 B2* | 10/2008 | Isaji | B60T 7/22 | 340/435 |
| 7,474,961 B2* | 1/2009 | Ibrahim | G01C 21/30 | 701/446 |
| 7,509,214 B2* | 3/2009 | Nagel | B60W 30/09 | 701/507 |
| 7,512,475 B2* | 3/2009 | Perisho, Jr. | B60K 31/0083 | 180/170 |
| 7,522,091 B2* | 4/2009 | Cong | B60K 31/0008 | 342/107 |
| 7,561,955 B2* | 7/2009 | Kubota | B60K 31/0008 | 340/435 |
| 7,734,404 B2* | 6/2010 | Shiiba | B60K 31/0066 | 303/121 |
| 7,751,973 B2* | 7/2010 | Ibrahim | G01C 21/30 | 340/332 |
| 7,764,192 B2* | 7/2010 | Sekine | B60T 8/1755 | 340/438 |
| 7,792,624 B2* | 9/2010 | Nakamura | G08G 1/161 | 340/437 |
| 7,831,366 B2* | 11/2010 | Imai | B60W 30/143 | 701/532 |
| 7,974,778 B2* | 7/2011 | Sawamoto | B60W 30/16 | 701/301 |
| 8,126,640 B2* | 2/2012 | Winner | G01S 13/931 | 701/300 |
| 8,180,513 B2* | 5/2012 | Wang | B60T 8/17551 | 180/170 |
| 8,265,847 B2* | 9/2012 | Miyajima | B60K 31/0066 | 701/72 |
| 8,271,174 B2* | 9/2012 | Okada | B60W 40/10 | 701/1 |
| 8,897,960 B2* | 11/2014 | Sekine | B60W 50/14 | 340/988 |

FOREIGN PATENT DOCUMENTS

| | | |
|---|---|---|
| JP | 03-051783 A | 3/1991 |
| JP | 2001-199295 A | 7/2001 |
| JP | 2008-070261 A | 3/2008 |
| JP | 2011-107108 A | 6/2011 |
| JP | 2014-106854 A | 6/2014 |

OTHER PUBLICATIONS

Partial Supplementary European Search Report dated Dec. 3, 2018 for the European Patent Application No. 15877995.9.

* cited by examiner

[Fig. 1]
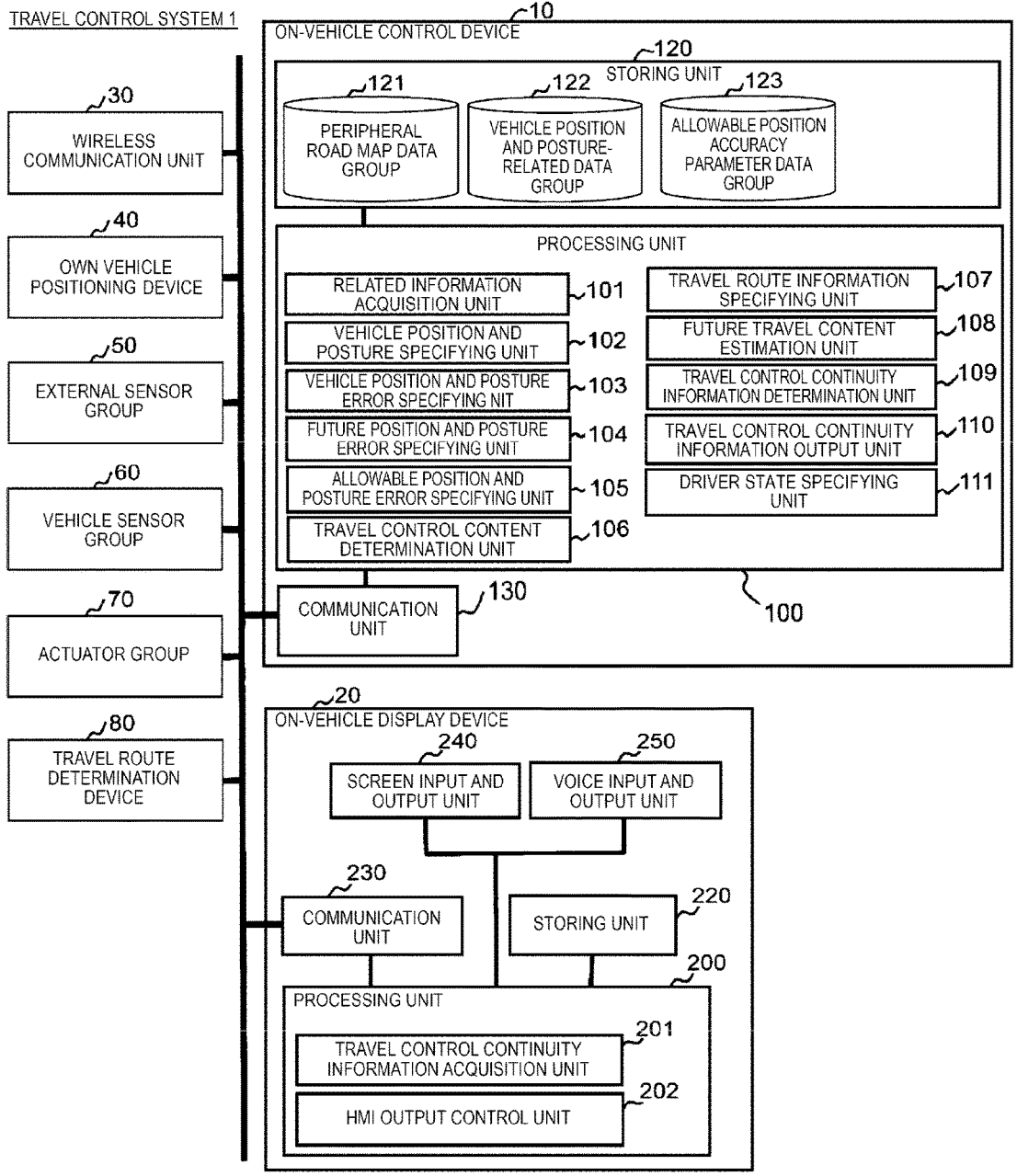

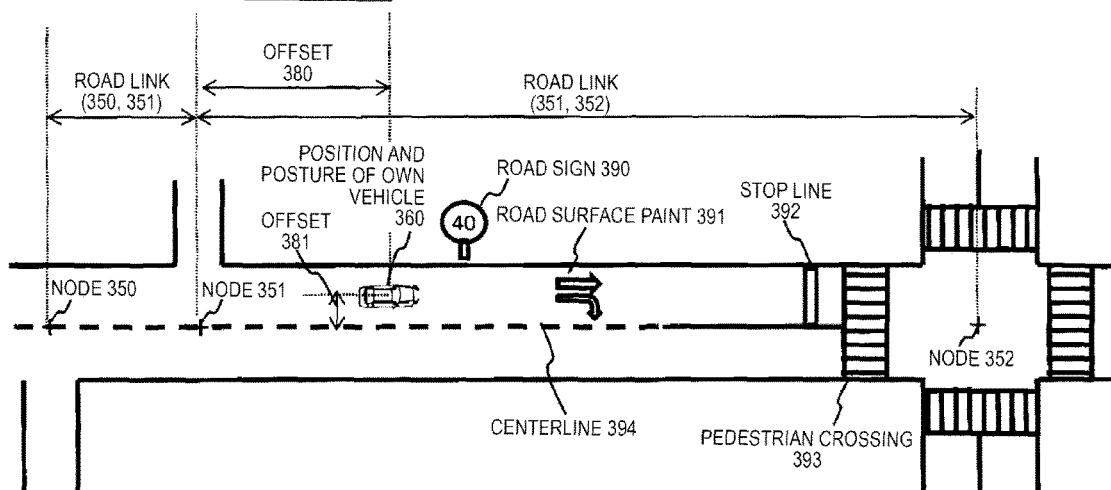

[Fig. 3]
VEHICLE POSITION AND POSTURE-RELATED DATA GROUP 122

| # | TIME (301) | POSITION AND POSTURE INFORMATION (302) | ACCUMULATIVE DISTANCE (303) | POSITION ERROR IN LONGITUDINAL DIRECTION (304) | POSITION ERROR IN LATERAL DIRECTION (305) | ANGLE ERROR IN ADVANCING DIRECTION (306) | POSITIONING STATE FLAG (307) |
|---|---|---|---|---|---|---|---|
| 1 | 2014/7/1 09:00:00.0 | {ROAD LINK (351,352), 100.0, 1.5, 90.0} | 45100.0m | 2.20m | 0.1m | 0.2° | (0, 1,1) |
| 2 | 2014/7/1 09:00:01.0 | {ROAD LINK (351,352), 115.2, 1.6, 90.1} | 45115.2m | 2.22m | 0.1m | 0.2° | (0, 1,1) |
| 3 | 2014/7/1 09:00:02.0 | {ROAD LINK (351,352), 129.5, 1.6, 90.1} | 45129.5m | 2.24m | 0.1m | 0.2° | (0, 1,1) |
| 4 | 2014/7/1 09:00:03.0 | {ROAD LINK (351,352), 142.3, 1.5, 89.8} | 45142.3m | 2.26m | 0.1m | 0.2° | (0, 1,1) |
| ... | ... | ... | ... | ... | ... | ... | ... |
| 10 | 2014/7/1 09:00:10.0 | {ROAD LINK (351,352), 258.0, 90.2} | 45258.0m | 2.40m | 0.1m | 0.2° | (0, 1,1) |
| 11 | 2014/7/1 09:00:11.0 | {ROAD LINK (351,352), 273.1, 90.2} | 45273.1m | 0.50m | 0.1m | 0.2° | (1, 1,1) |
| 12 | 2014/7/1 09:00:12.0 | {ROAD LINK (351,352), 287.0, 90.2} | 45287.0m | 0.50m | 0.1m | 0.2° | (1, 1,1) |
| ... | ... | ... | ... | ... | ... | ... | ... |

[Fig. 4]

ALLOWABLE POSITION ACCURACY PARAMETER DATA GROUP 123

| # | TRAVEL CONTROL LEVEL (371) | ENVIRONMENTAL CONDITION (372) | ALLOWABLE ERROR IN LONGITUDINAL DIRECTION (373) | ALLOWABLE ERROR IN LATERAL DIRECTION (374) |
|---|---|---|---|---|
| 1 | LEVEL 1 (ACCELERATION AND DECELERATION) | DECELERATION CONTROL (10 km/h OR MORE) | 10m | N/A |
| 2 | LEVEL 1 (ACCELERATION AND DECELERATION) | DECELERATION (STOP) CONTROL (LESS THAN 10 km/h) | 3m | N/A |
| ... | ... | ... | ... | ... |
| 11 | LEVEL 2 (STEERING + ACCELERATION AND DECELERATION) | NORMAL TRAVEL (DEFAULT) | 10m | 0.5m |
| 12 | LEVEL 2 (STEERING + ACCELERATION AND DECELERATION) | CURVED LINE TRAVEL (R>=300) | 5m | 0.5m |
| 13 | LEVEL 2 (STEERING + ACCELERATION AND DECELERATION) | CURVED LINE TRAVEL (R<300) | 2m | 0.5m |
| 14 | LEVEL 2 (STEERING + ACCELERATION AND DECELERATION) | DECELERATION (STOP) CONTROL (LESS THAN 10 km/h) | 2m | 0.5m |
| 15 | LEVEL 2 (STEERING + ACCELERATION AND DECELERATION) | INTERSECTION LEFT AND RIGHT TURN | 1m | 0.5m |
| | | ... | | |
| 21 | LEVEL 3 (STEERING + ACCELERATION AND DECELERATION + NO DRIVER MONITORING) | NORMAL TRAVEL (DEFAULT) | 10m | 0.5m |
| 22 | LEVEL 3 (STEERING + ACCELERATION AND DECELERATION + NO DRIVER MONITORING) | CURVED LINE TRAVEL (R>=300) | 5m | 0.5m |
| 23 | LEVEL 3 (STEERING + ACCELERATION AND DECELERATION + NO DRIVER MONITORING) | CURVED LINE TRAVEL (R<300) | 2m | 0.5m |
| 24 | LEVEL 3 (STEERING + ACCELERATION AND DECELERATION + NO DRIVER MONITORING) | DECELERATION (STOP) CONTROL (LESS THAN 10 km/h) | 2m | 0.5m |
| 25 | LEVEL 3 (STEERING + ACCELERATION AND DECELERATION + NO DRIVER MONITORING) | INTERSECTION LEFT AND RIGHT TURN | 1m | 0.5m |
| ... | | ... | ... | ... |

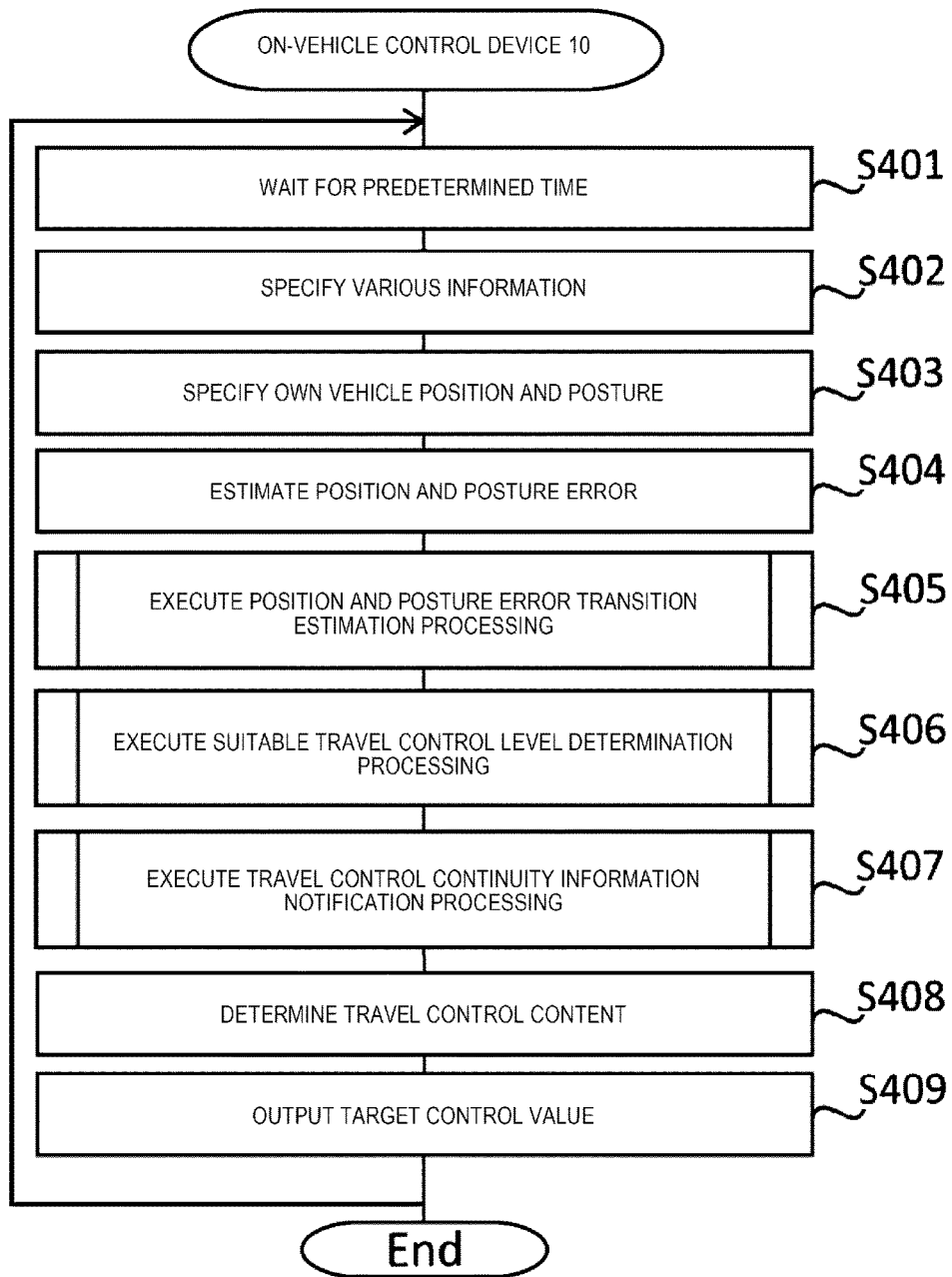

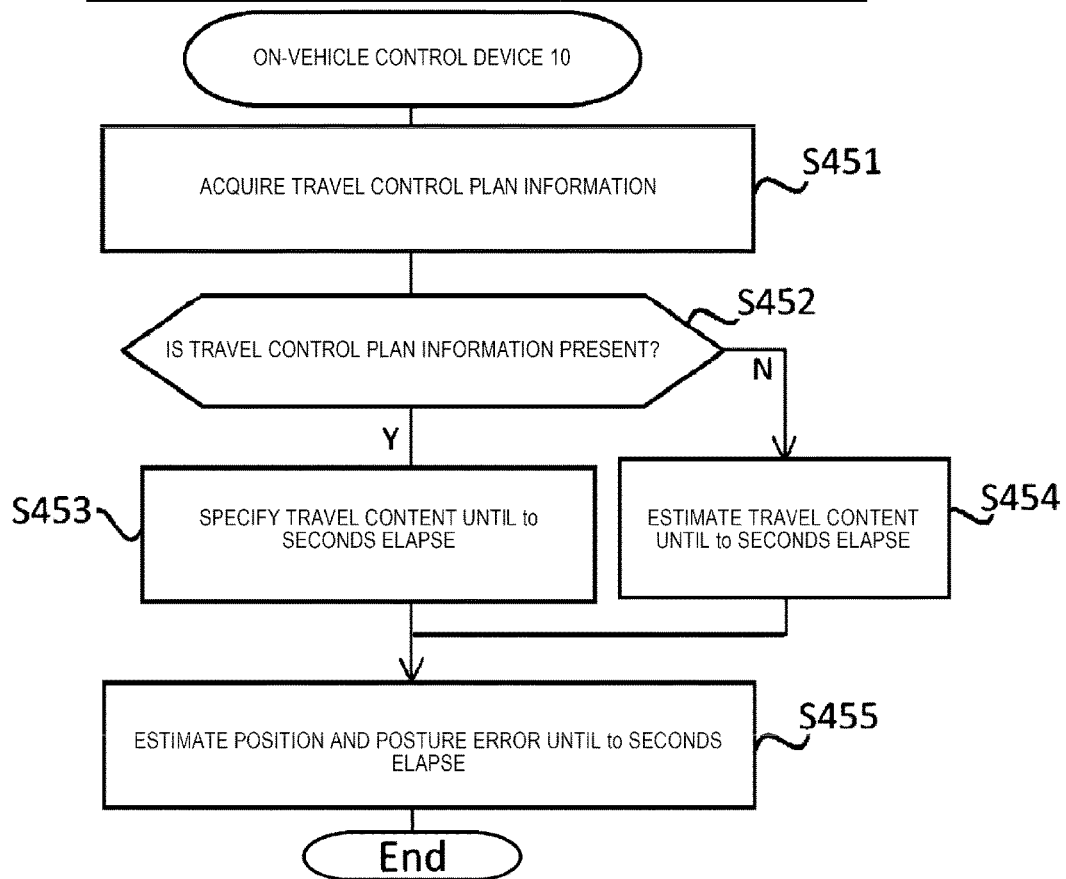

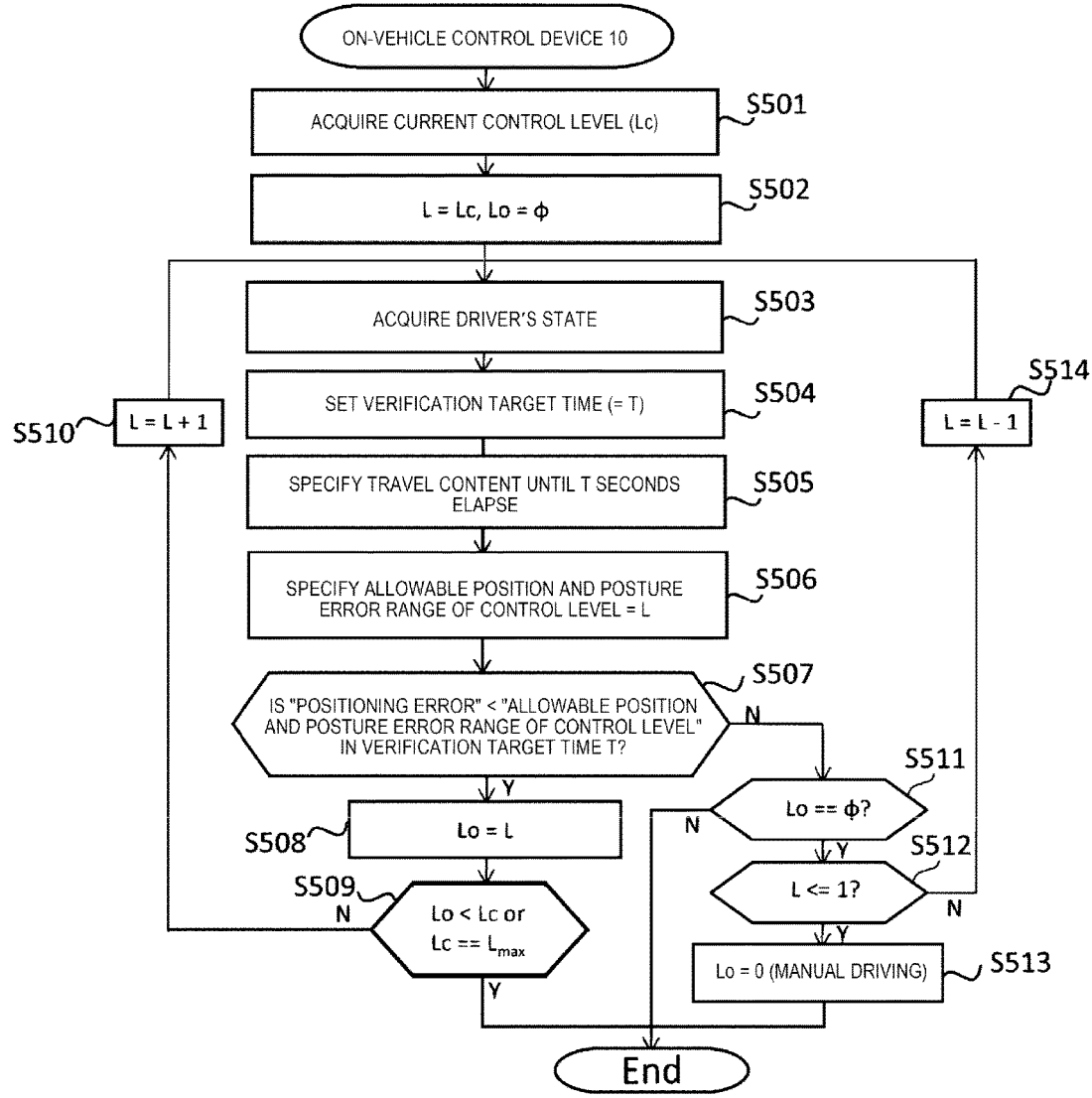
[Fig. 7]

[Fig. 8]
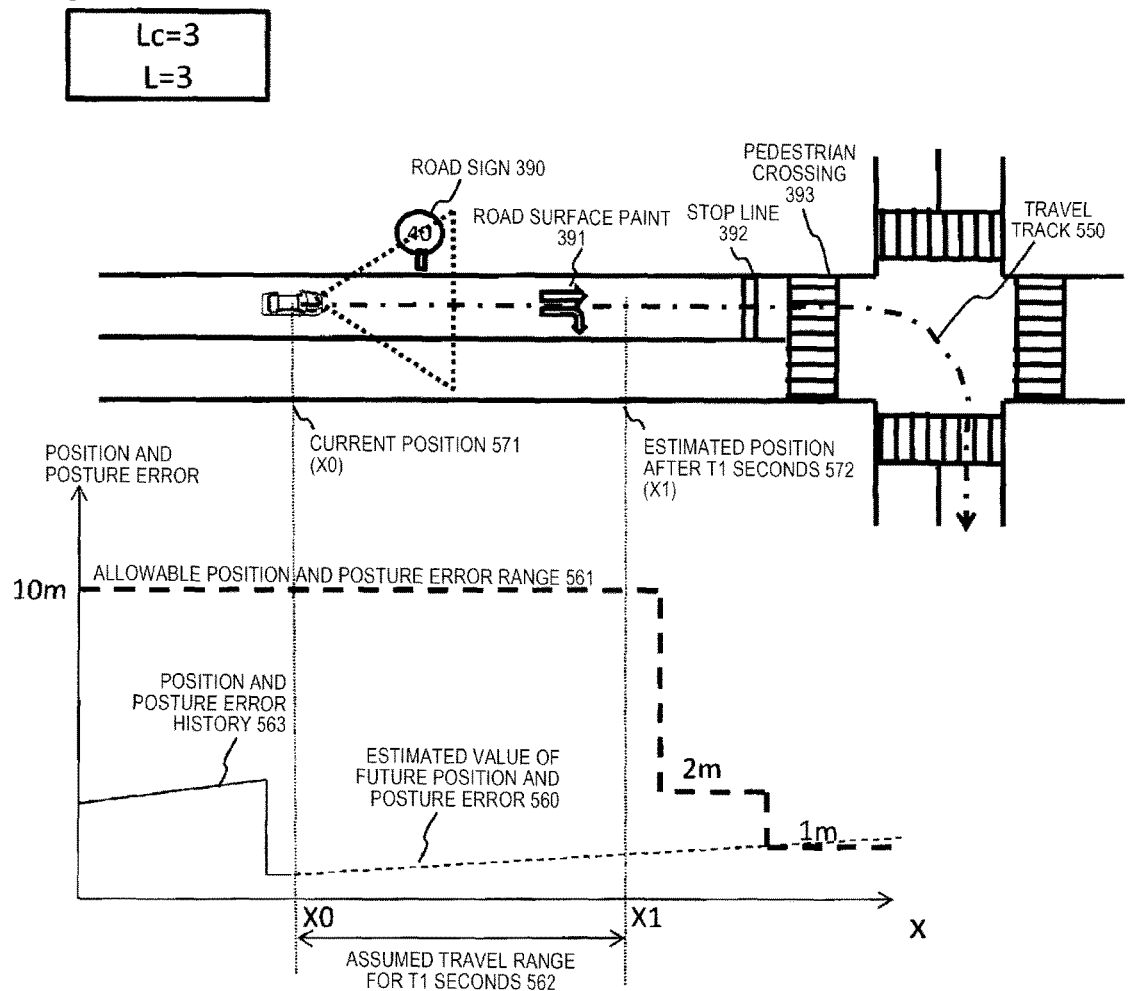

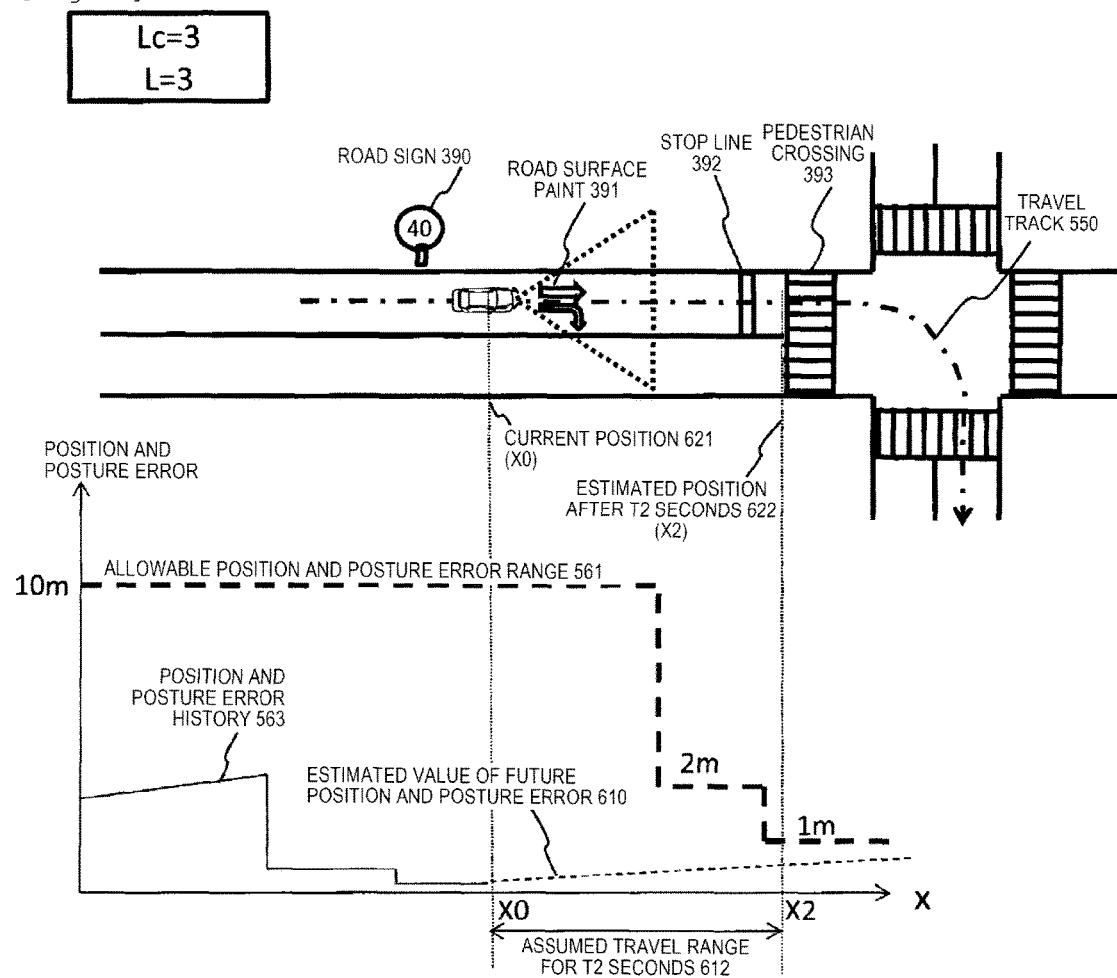
[Fig. 9]

[Fig. 10]
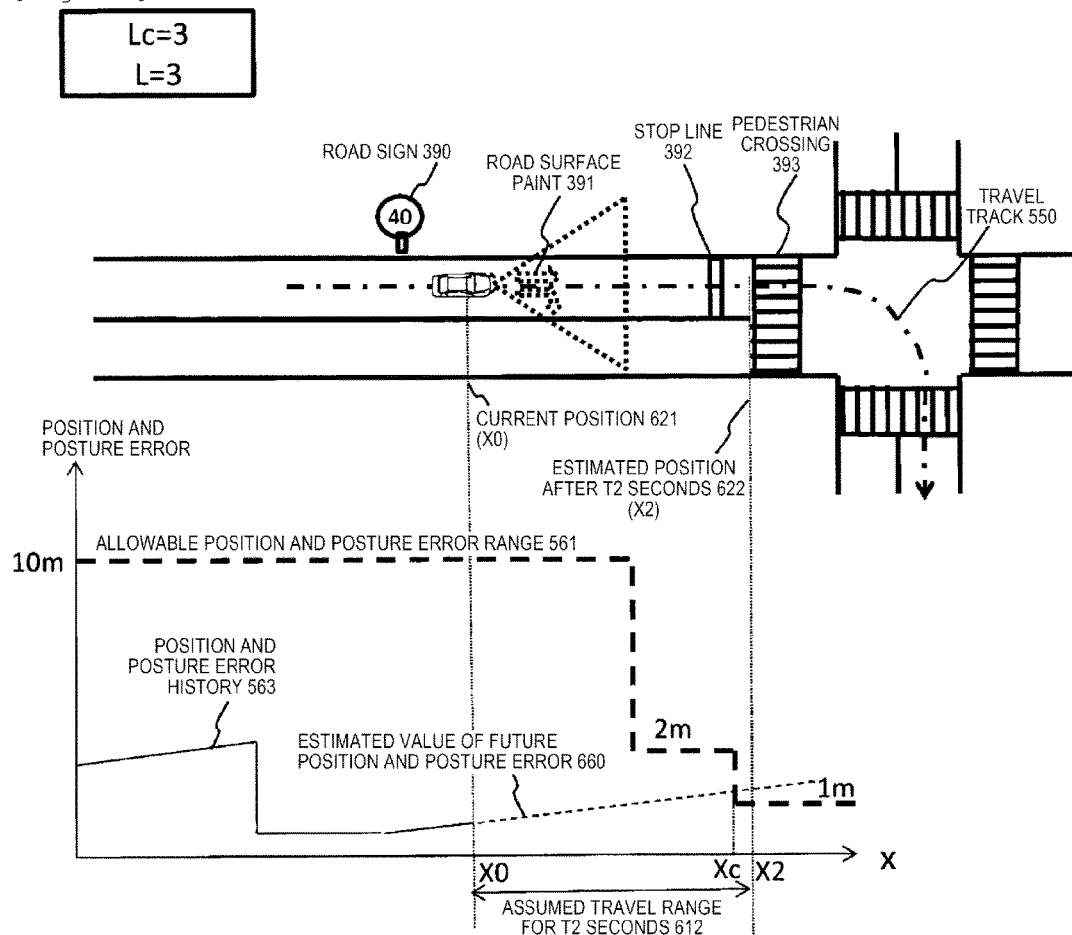

[Fig. 11]
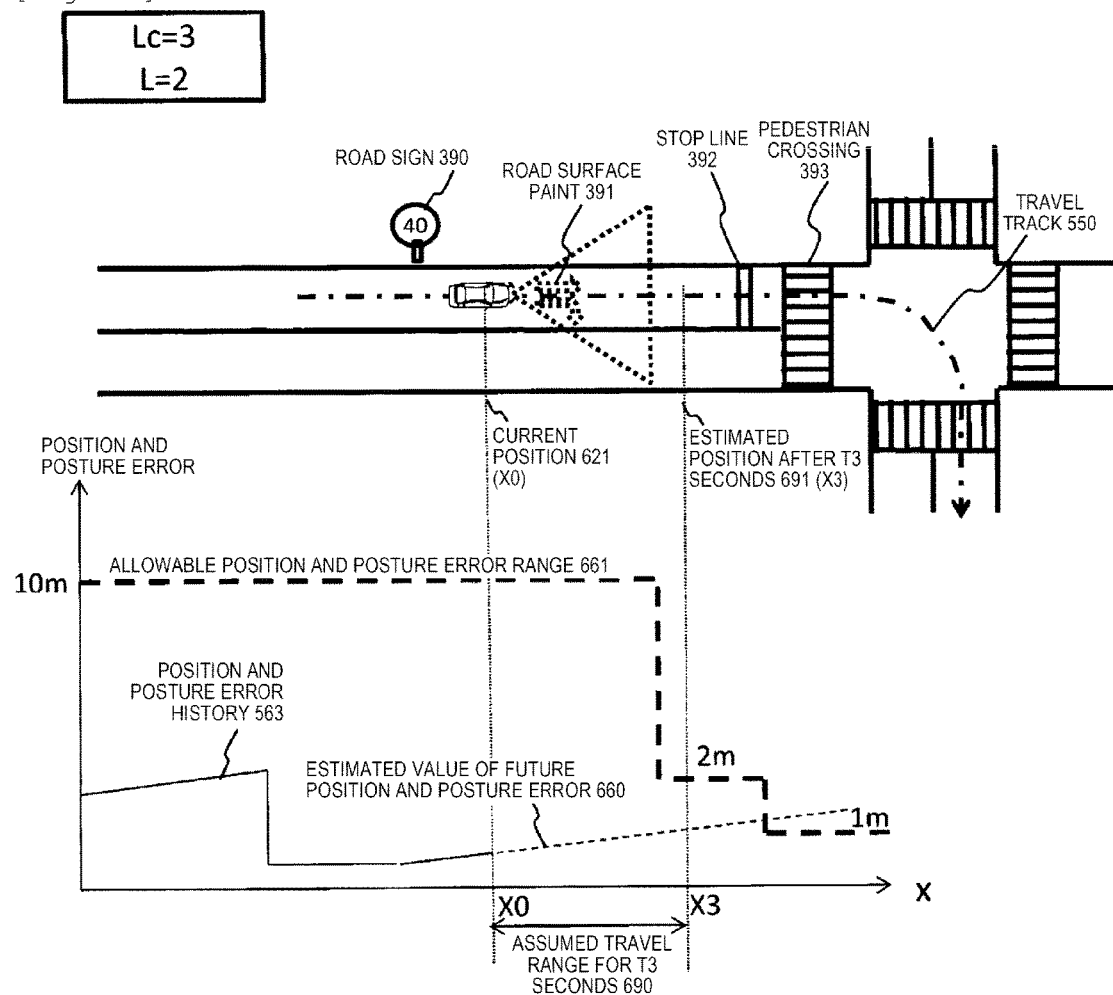

[Fig. 12]
TRAVELING CONTROL CONTINUITY INFORMATION NOTIFICATION PROCESSING FLOW 700
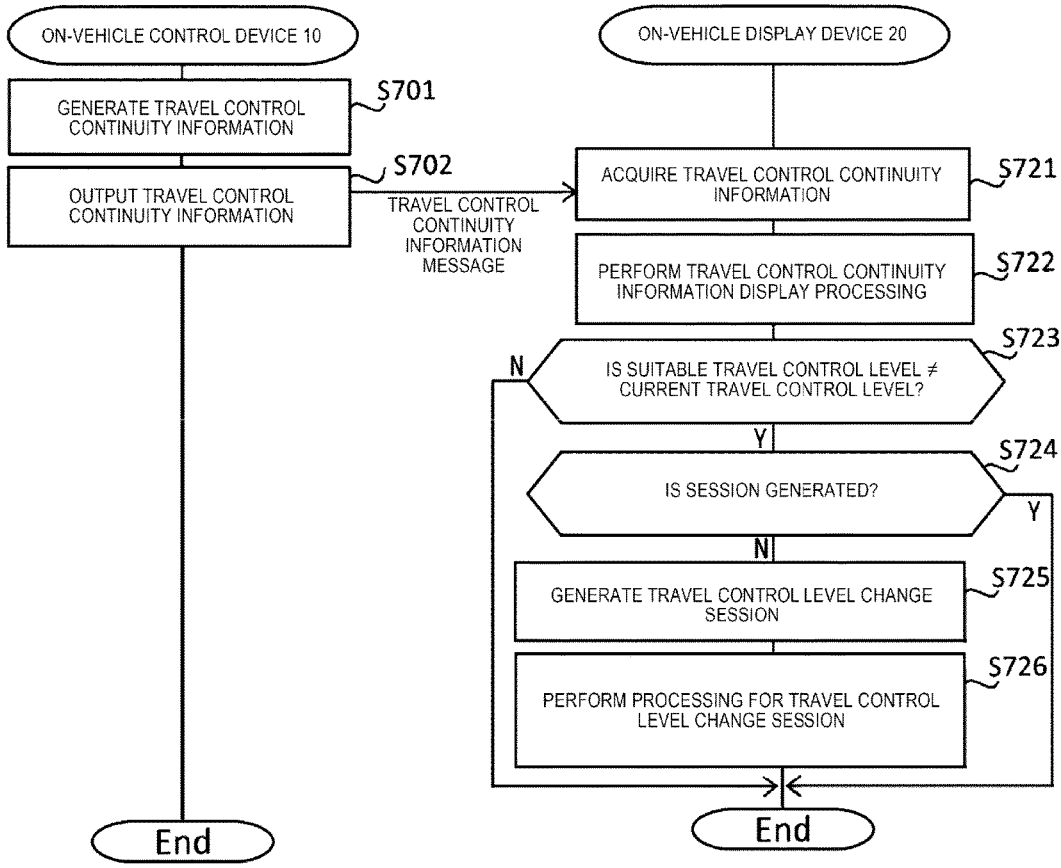
[Fig. 13]
TRAVEL CONTROL CONTINUITY INFORMATION MESSAGE FORMAT 750
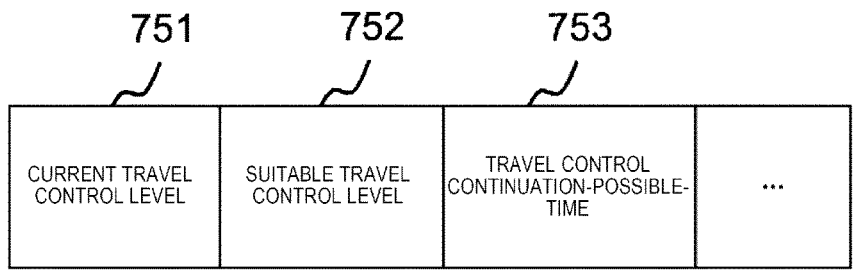

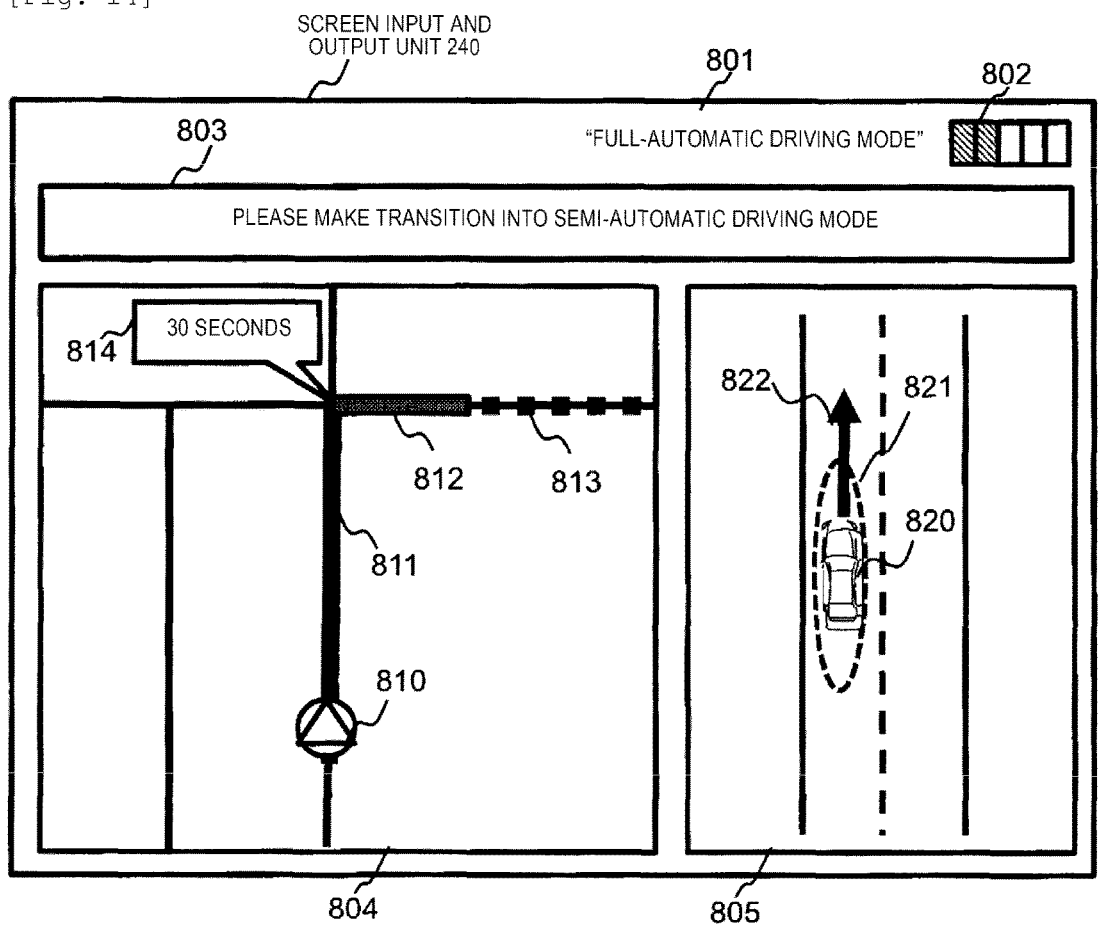

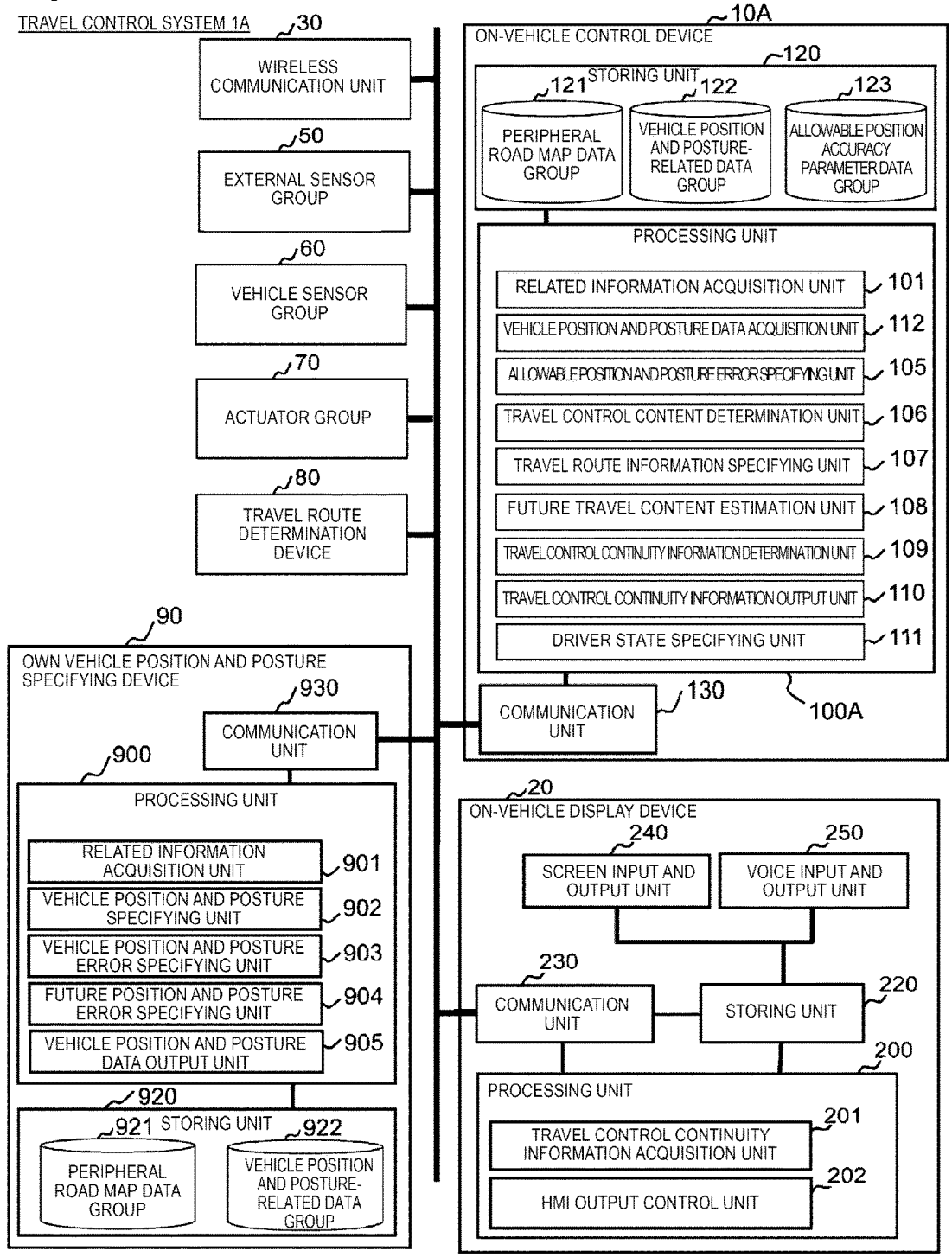
[Fig. 15]

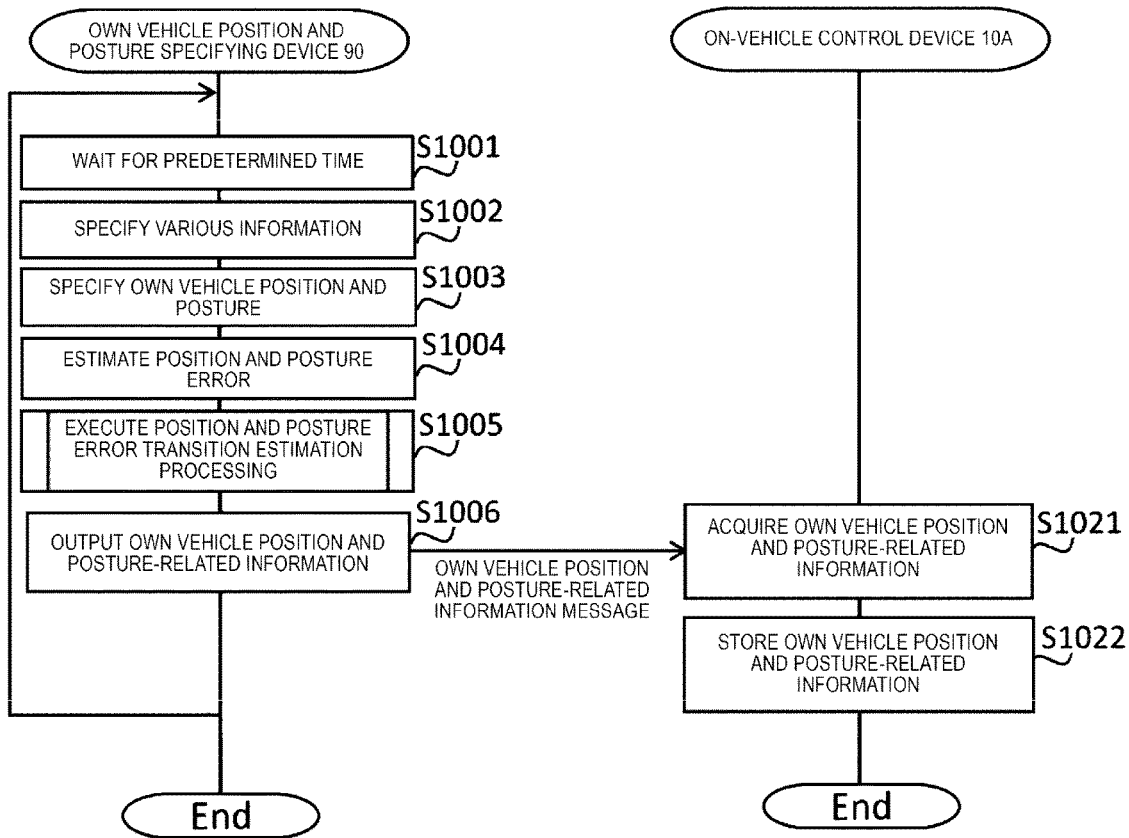
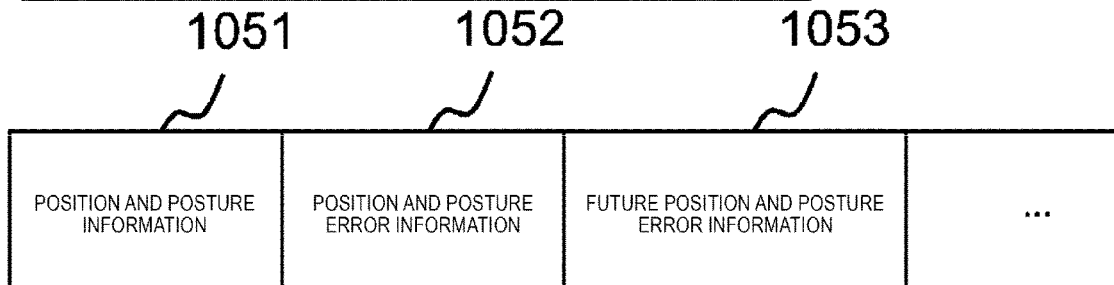

[Fig. 18]
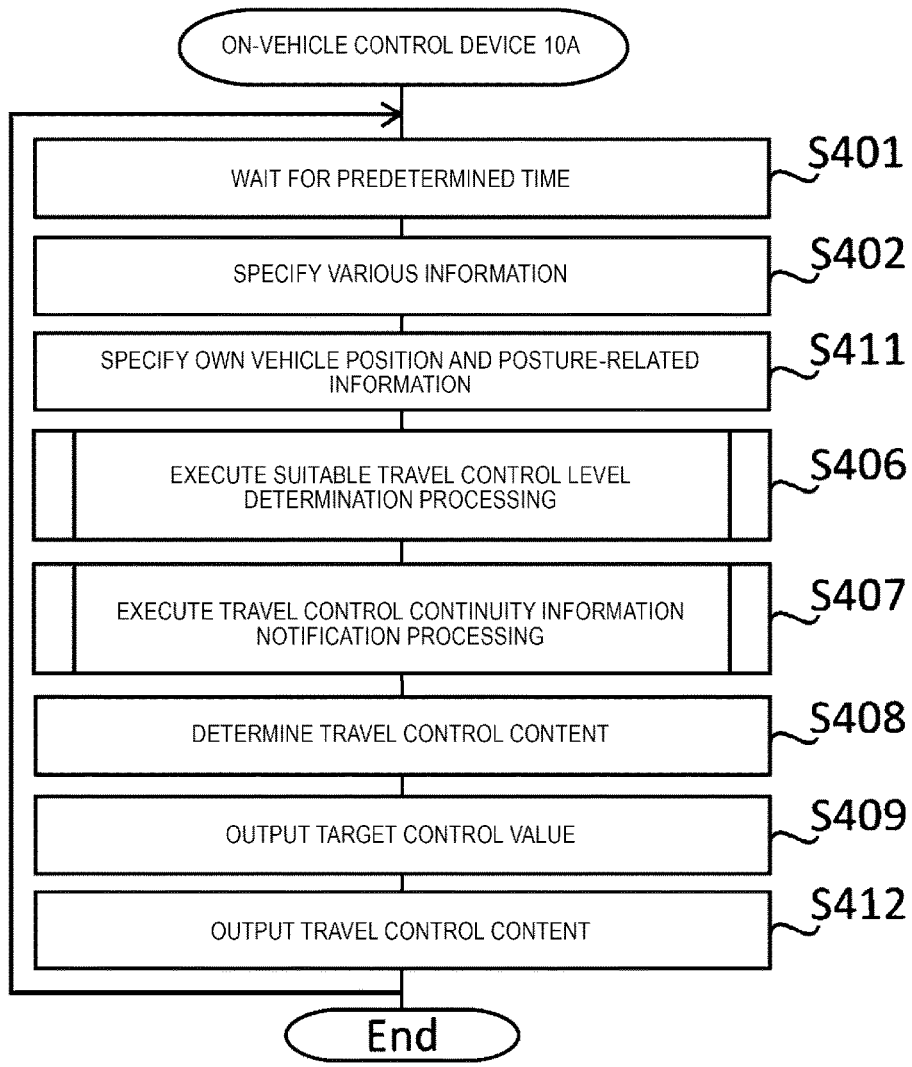

ON-VEHICLE CONTROL DEVICE, HOST VEHICLE POSITION AND POSTURE SPECIFYING DEVICE, AND ON-VEHICLE DISPLAY DEVICE

TECHNICAL FIELD

The present invention is related to an on-vehicle control device, an own vehicle position and posture specifying device, and an on-vehicle display device that are utilized by being mounted on a vehicle.

BACKGROUND ART

A system that recognizes a shape of a traveling road of a vehicle or a traffic rule using road map data and automatically controls traveling of the vehicle is known. In such a system, there is a possibility that when estimation accuracy of a position and posture of a vehicle is deteriorated in road map data, a shape of a traveling road or a traffic rule is erroneously referenced and dangerous travel control is caused. Under such a situation, a state in which automatic driving control by the system can continue is not allowed and thus, switching into manual driving is needed, however, there is a problem that even though a control right is abruptly handed over from the system, a driver is not able to instantly react.

In relation to the problem, a technology disclosed in PTL 1 is known. In PTL 1, a technology in which stability of automatic driving control is determined according to a detection state of a white line in front of an own vehicle and displaying is performed on the on-vehicle display device based on the determination result.

CITATION LIST

Patent Literature

PTL 1: JP-A-2001-199295

SUMMARY OF INVENTION

Technical Problem

In the technology of PTL 1 described above, stability of automatic driving control is determined based on a white line detection state at respective points in time. For that reason, even in a case where there is practically no problem in automatic driving control, for example, a case where the white line detection state is temporarily deteriorated, a notification that automatic driving control is unstable is made. As a result, a driver receives an unnecessary notification and feels annoyed. In a case where stability of automatic driving control abruptly drops, the driver may not be able to immediately respond even when the notification is received. As such, in the conventional technology, there is a problem that in a case where position estimation accuracy of an own vehicle is deteriorated, a notification relating to continuity of automatic driving is not able to be performed with high accuracy and sufficiently beforehand.

Solution to Problem

According to the present invention, there is provided an on-vehicle control device that is mounted on a vehicle to control traveling of the vehicle, the device including a vehicle position error specifying unit that estimates a position error of the vehicle, a travel control continuity information determination unit that determines information relating to continuity of a travel control state of the vehicle based on the position error of the vehicle estimated by the vehicle position error specifying unit, and a travel control continuity information output unit that outputs the information relating to the continuity of the travel control state of the vehicle determined by the travel control continuity information determination unit.

According to the present invention, there is provided an own vehicle position and posture specifying device including a vehicle position and posture specifying unit that specifies a position and a posture of a vehicle, a future position and posture error specifying unit that estimates a future position error and a future posture error of the vehicle, and a vehicle position and posture data output unit that outputs a message including information relating to the position and posture of the vehicle specified by the vehicle position and posture specifying unit and information relating to the future position error and the future posture error of the vehicle estimated by the future position and posture error specifying unit.

According to the present invention, there is provided an on-vehicle display device that is mounted on a vehicle, the device including a travel control continuity information acquisition unit that acquires information relating to continuity of a travel control state of the vehicle and a screen input and output unit that displays information including travel control continuation-possible-time of the current vehicle on a screen based on information acquired by the travel control continuity information acquisition unit.

Advantageous Effects of Invention

According to the present invention, in a case where position estimation accuracy of an own vehicle is deteriorated, it is possible to perform a notification relating to continuity of automatic driving with high accuracy and sufficiently beforehand.

BRIEF DESCRIPTION OF DRAWINGS

FIG. 1 is a functional block diagram illustrating an example of a configuration of a travel control system 1 according to a first embodiment of the present invention.

FIG. 2 is a diagram illustrating an example of a data structure of a peripheral road map data group 121.

FIG. 3 is a diagram illustrating an example of a data structure of a vehicle position and posture-related data group 122.

FIG. 4 is a diagram illustrating an example of a data structure of an allowable position accuracy parameter data group 123.

FIG. 5 is a flowchart of travel control processing executed in an on-vehicle control device 10 of the first embodiment of the present invention.

FIG. 6 is a flowchart of position and posture error transition estimation processing executed in the on-vehicle control device 10 of the first embodiment of the present invention.

FIG. 7 is a flowchart of suitable travel control level determination processing executed in the on-vehicle control device 10 of the first embodiment of the present invention.

FIG. 8 is a diagram illustrating an example of a specific travel scene for explaining operations of the suitable travel control level determination processing in the on-vehicle control device 10 of the first embodiment of the present invention.

FIG. 9 is a diagram illustrating another example of the specific travel scene for explaining operations of the suitable travel control level determination processing in the on-vehicle control device 10 of the first embodiment of the present invention.

FIG. 10 is a diagram illustrating another example of the specific travel scene for explaining operations of the suitable travel control level determination processing in the on-vehicle control device 10 of the first embodiment of the present invention.

FIG. 11 is a diagram illustrating another example of the specific travel scene for explaining operations of the suitable travel control level determination processing in the on-vehicle control device 10 of the first embodiment in the present invention.

FIG. 12 is a flowchart of traveling control continuity information notification processing in the on-vehicle control device 10 and an on-vehicle display device 20 of the first embodiment of the present invention.

FIG. 13 is a diagram illustrating an example of a travel control continuity information message format output by the on-vehicle control device 10 of the first embodiment of the present invention.

FIG. 14 is a diagram illustrating an example of a display screen of travel control continuity information by the on-vehicle display device 20 of the first embodiment of the present invention.

FIG. 15 is a functional block diagram illustrating an example of a configuration of a travel control system 1A according to a second embodiment of the present invention.

FIG. 16 is a flowchart of vehicle position and posture specification processing executed in an own vehicle position and posture specifying device 90 and the on-vehicle control device 10A of the second embodiment of the present invention.

FIG. 17 is a diagram illustrating an example of an own vehicle position and posture-related information message format output by the own vehicle position and posture specifying device 90 of the second embodiment of the present invention.

FIG. 18 is a flowchart of travel control processing executed in the on-vehicle control device 10A of the second embodiment of the present invention.

DESCRIPTION OF EMBODIMENTS

Hereinafter, an embodiment of the present invention will be described with reference to accompanying drawings.

First Embodiment

FIG. 1 is a functional block diagram illustrating an example of a configuration of a travel control system 1 according to a first embodiment of the present invention.

As illustrated in FIG. 1, the travel control system 1 according to the present embodiment is a system mounted on a vehicle and automatically controlling a portion or the entirety of traveling of the vehicle. The travel control system 1 is configured to include an on-vehicle control device 10, an on-vehicle display device 20, a wireless communication unit 30, an own vehicle positioning device 40, an external sensor group 50, a vehicle sensor group 60, an actuator group 70, a travel route determination device 80, and the like. In the following description, a vehicle mounted on the travel control system 1 is referred to as an own vehicle.

The on-vehicle control device 10 is a device that performs various processing or control for realizing automatic travel control of the own vehicle and includes a processing unit 100, a storing unit 120, and a communication unit 130. As the on-vehicle control device 10, for example, an electronic control unit (ECU) mounted on the own vehicle, or the like is used. A form of the on-vehicle control device 10 is not especially limited and any device other than the ECU may also be used as the on-vehicle control device 10. For example, the on-vehicle control device 10 may be a travel control device for realizing an advanced driver assistance systems (ADAS) of the own vehicle. The on-vehicle control device 10 may be integrated with the external sensor group 50, or the like and a user of the own vehicle may also use an external device such as a smart phone connected to a vehicle network as the on-vehicle control device 10.

The processing unit 100 is configured to include, for example, a central processing unit (CPU) and a memory such as a random access memory (RAM). The processing unit 100 includes a related information acquisition unit 101, a vehicle position and posture specifying unit 102, a vehicle position and posture error specifying unit 103, a future position and posture error specifying unit 104, an allowable position and posture error specifying unit 105, a travel control content determination unit 106, a travel route information specifying unit 107, a future travel content estimation unit 108, a travel control continuity information determination unit 109, a travel control continuity information output unit 110, and a driver state specifying unit 111, as portions for realizing functionalities of the on-vehicle control device 10. The processing unit 100 executes predetermined operation programs stored in the storing unit 120 so as to make it possible to perform processing corresponding to the respective units.

The related information acquisition unit 101 is a portion for acquiring various pieces information (peripheral road map, travel route information, positioning information, external world recognition information, vehicle sensor information, and the like) needed when determining a position and a posture or a travel control content of the own vehicle. The vehicle position and posture specifying unit 102 is a portion for specifying the position and posture of the own vehicle based on positioning information. The vehicle position and posture error specifying unit 103 is a portion for estimating an error of the position and posture of the own vehicle specified by the vehicle position and posture specifying unit 102. The future position and posture error specifying unit 104 is a portion for estimating a future position and posture error of the own vehicle. The allowable position and posture error specifying unit 105 is a portion for specifying accuracy of the position or the posture capable of being allowed in order for target travel control to be correctly operated. The travel control content determination unit 106 is a portion for determining a travel control content of the own vehicle. The travel route information specifying unit 107 is a portion for specifying information relating to an assumed travel route of the own vehicle. The future travel content estimation unit 108 is a portion for estimating a future travel content of the own vehicle. The travel control continuity information determination unit 109 is a portion for determining information relating to whether a current travel control state continues. The travel control continuity information output unit 110 is a portion for outputting information determined by the travel control continuity information determination unit 109 to the on-vehicle display device 20 using the communication unit 130. The driver state specifying unit 111 is a portion for specifying a state of a driver. In the present specification, "specifying" is assumed to include making an estimate or making determination.

The storing unit 120 is configured to include a storage device, for example, a hard disk drive (HDD), a flash memory, a read only memory (ROM), and the like. The storing unit 120 stores a program executed by the processing unit 100 or various data groups needed for realization of the present system. In the present embodiment, especially, as information for realizing functionalities of the on-vehicle control device 10, respective information of a peripheral road map data group 121, a vehicle position and posture-related data group 122, and an allowable position accuracy parameter data group 123 are stored in the storing unit 120.

The peripheral road map data group 121 is aggregate of digital road map data relating to a road around the own vehicle which is needed to determine the position and posture or the travel control content of the own vehicle. For example, information of a network structure, an attribute (a type, a speed limit, an advancing direction, or the like of a road), a shape (a lane shape of a road, a shape of an intersection, or the like), a land mark (a road sign, paint on a road surface, or the like), and the like of a road is included in the peripheral road map data group 121. As a management method of the peripheral road map data group 121, various methods can be used. For example, the management method may be configured in such a way that the entirety of map data may be stored in the on-vehicle control device 10 in advance and be received from an external device such as the on-vehicle display device 20. The management method may also be configured to receive the map data from outside of the own vehicle via the wireless communication unit 30.

The vehicle position and posture-related data group 122 is aggregate of data indicating specification results of the position and posture of the own vehicle and information related thereto. For example, position and posture information of the own vehicle specified based on positioning information acquired from the own vehicle positioning device 40, information relating to the position and posture and an error of the position and posture of the own vehicle that are respectively specified by the vehicle position and posture specifying unit 102 and the vehicle position and posture error specifying unit 103, and the like are included in the vehicle position and posture-related data group 122.

The allowable position accuracy parameter data group 123 is aggregate of data relating to parameters used for specifying position accuracy which is capable of being allowed by the allowable position and posture error specifying unit 105.

The communication unit 130 performs transmission and reception of data with another device mounted on the own vehicle based on various protocols. The communication unit 130 is configured to include, for example, a network card in accordance with standards of communication such as the Ethernet (registered trademark) or a controller area network (CAN). The connection form between the communication unit 130 and other devices is not limited to wired connection such as the Ethernet and may be short-range wireless connection such as the Bluetooth (registered trademark), a wireless local area network (LAN), or the like.

The on-vehicle display device 20 is a display device mounted on the own vehicle. The on-vehicle display device 20 includes a processing unit 200, a storing unit 220, a communication unit 230, a screen input and output unit 240, and a voice input and output unit 250. A form of the on-vehicle display device 20 is not particularly limited. For example, as the on-vehicle display device 20, a navigation device or an external device such as a smart phone connected to an in-vehicle network by a user of the own vehicle can be used.

The processing unit 200 is configured to include, for example, the CPU or a memory such as the RAM, similar to the processing unit 100 of the on-vehicle control device 10. The processing unit 200 includes a travel control continuity information acquisition unit 201 and an HMI output control unit 202 as portions for realizing functionalities of the on-vehicle display device 20. The processing unit 200 executes a predetermined operation program stored in the storing unit 220 so as to make it possible to perform processing that corresponds to respective units.

The travel control continuity information acquisition unit 201 is a portion for acquiring information relating to travel control continuity of the own vehicle from the on-vehicle control device 10. The HMI output control unit 202 is a portion for respectively outputting various screens or voices to the screen input and output unit 240 and the voice input and output unit 250 based on information acquired by the travel control continuity information acquisition unit 201. The screen input and output unit 240 is configured using, for example, a liquid crystal display and displays various screen according to control of the HMI output control unit 202. The voice input and output unit 250 is configured using, for example, an amplifier and a speaker and outputs various voice according to control of the HMI output control unit 202.

The storing unit 220 is configured to include a storage device, for example, the HDD, the flash memory, the ROM, or the like, similar to the storing unit 120 of the on-vehicle control device 10. The storing unit 220 stores the program executed by the processing unit 200 or a data group needed for realization of the present system.

The communication unit 230 performs transmission and reception of data with another device mounted on the own vehicle based on various protocols, similar to the communication unit 130 of the on-vehicle control device 10. The communication unit 230 is configured to include, for example, a network card in accordance with standards of communication such as the Ethernet or the CAN. The connection form between the communication unit 230 and other devices is not limited to wired connection such as the Ethernet and may be short-range wireless connection such as the Bluetooth, the wireless LAN, or the like.

The wireless communication unit 30 performs wireless communication between the travel control system 1 and another device installed outside the own vehicle. The wireless communication unit 30 includes, for example, a network card in accordance with a long-range wireless communication standard such as the long term evolution (LTE) or a short-range wireless communication standard such as wireless LAN or the dedicated short range communications (DSRCs). The wireless communication unit 30 connects to various connection destinations according to an application and a purpose of data so as to make it possible to perform wireless communication. For example, the wireless communication unit 30 is configured in such a way that data communication becomes possible among a server installed for supporting traveling of a plurality of vehicles including the own vehicle, a roadside machine installed on a road, wireless communication devices mounted on other vehicles, a communication terminal held by an individual, and the like.

The own vehicle positioning device 40 is a device that positions a geographical position of the own vehicle and provides positioning information indicating the positioning result to the on-vehicle control device 10. The own vehicle positioning device 40 is able to be realized by using, for example, a global navigation satellite system (GNSS) receiving device. In this case, the own vehicle positioning device 40 may also be configured in such a way that the positioning result is simply provided based on radio waves received from the GNSS satellite. Otherwise, the own vehicle positioning device 40 may also be configured in such a way that position interpolation or error correction on the positioning result by the GNSS satellite is performed by utilizing information such as a moving speed, an advancing azimuth, and the like of the own vehicle capable of being acquired from the external sensor group 50 or the vehicle sensor group 60 and positioning information is output based on the result. The positioning information output from the own vehicle positioning device 40 typically represents a position of the own vehicle using a value of a predetermined geographical coordinate system such as a latitude and a longitude. However, as long as information is capable of being used for specifying a road on which the own vehicle travels, information other than the positioning information own vehicle may also be available. For example, information indicating a road on which the own vehicle travels and a position on the road may be output from the own vehicle positioning device 40 as the positioning information.

The external sensor group 50 is a sensor group capable of recognizing an obstacle (another vehicle, bicycle, pedestrian, falling object, or the like) or a conspicuous thing (road sign, white line, land mark, or the like) located within a fixed range of the periphery of the own vehicle. The external sensor group 50 is able to be realized by using, for example, a camera device, radar, laser radar, sonar, and the like. The external sensor group 50 outputs detection information (for example, relative angle and relative distance from own vehicle) of the obstacle or the conspicuous thing that exists in the periphery of the own vehicle onto the in-vehicle network. Another device including the on-vehicle control device 10 is configured to be able to acquire the detection information output from the external sensor group 50 through the in-vehicle network. In the present embodiment, although a configuration in which a sensor signal is acquired in the external sensor group 50 and processing for detecting the obstacle or the conspicuous thing is conducted based on the acquired sensor signal in the external sensor group 50 is adopted, data of the sensor signal acquired in the external sensor group 50 may be output without being processed. In this case, detection processing is performed by another device such as the on-vehicle control device 10 based on data of the sensor signal output from the external sensor group 50 so as to make it possible to obtain a desired detection result.

The vehicle sensor group 60 is a device group that detects a state (for example, travel speed, steering angle, accelerator operation amount, brake operation amount) of various parts of the own vehicle. The vehicle sensor group 60 regularly outputs the detected state amount onto the in-vehicle network, for example, the CAN. Another device including the on-vehicle control device 10 connected to the in-vehicle network is configured to be able to acquire the state amount of various parts of the own vehicle from the vehicle sensor group 60 through the in-vehicle network.

The actuator group 70 is a device group that controls control elements such as steering, braking, acceleration, or the like that determines a movement of the own vehicle. The actuator group 70 is configured to control the movement of the own vehicle based on a target control value output from the on-vehicle control device and operation information of a handle, a brake pedal, an accelerator pedal by the driver.

The travel route determination device 80 is a device that determines a recommended travel route for reaching a destination designated by the driver or an occupant based on a position of own vehicle. The travel route determination device 80 corresponds to, for example, a navigation device. In the present embodiment, the travel route determination device 80 may be configured to output information relating to the determined recommended travel route onto the in-vehicle network. The travel route information specifying unit 107 of the on-vehicle control device 10 acquires information output from the travel route determination device 80 so as to make it possible to specify an assumed travel route of the own vehicle.

Next, details of data stored in the storing unit 120 of the on-vehicle control device 10 will be described with reference to FIGS. 2 to 4.

FIG. 2 is a diagram illustrating an example of a data structure of a peripheral road map data group 121 in the storing unit 120 of the on-vehicle control device 10.

In FIG. 2, a portion of information stored in the peripheral road map data group 121 is extracted and an example of the content represented by the information is illustrated in a simulation manner.

The road illustrated in FIG. 2 is configured with a set of road links representing respective road sections divided for each predetermined distance and nodes representing end-points of respective road links. The nodes are placed at, for example, intersections at which a plurality of road intersect with each other, a point at which a shape or a structure of a road is changed, a point at which an attribute of the road is changed, or the like. Each node has an identifier called a node ID. In FIG. 2, node IDs 350 to 352 are illustrated as examples of the nodes. In the following, a value of the node ID is also used as a reference symbol of a node identified by the node ID. For example, a node identified by the node ID 350 is also simply described as a node 350.

Each road link is represented by a pair of node IDs. That is, in FIG. 2, a road link connecting the node 350 and the node 351 is represented by (350, 351) and a road link connecting the node 351 and the node 352 is represented by (351, 352). In the following description, it is assumed that each road link is represented by differentiating an advancing direction. That is, the road link (350, 351) illustrated in FIG. 2 represents a road link which corresponds to a road section in a direction directed from the node 350 to the node 351. Although not illustrated in FIG. 2, a road link which corresponds to a road section in a direction directed from the node 351 to the node 350 is represented as (351, 350), contrary to the road link (350, 351). A representation method of the road link is not limited thereto. For example, the road links between the node 350 and the node 351 in both directions together may also be represented by the (350, 351). In this case, a road link in each direction may be differentiated by being combined with data representing the advancing direction. Each road link may be represented by allocation a non-duplicated ID (link ID) to each road link without using a node ID.

In FIG. 2, a position and posture of own vehicle 360 represents a position and a posture of an own vehicle. Here, although the position and posture of own vehicle 360 is information which is normally not included in a peripheral road map data group 121, in FIG. 2, the position and posture of own vehicle 360 is illustrated in the figure for convenience of explanation. The position and posture of own vehicle 360 is represented by combining position information and posture information. The position information of the position and posture of own vehicle 360 is represented as, for example, a point on a coordinate system defined according to a peripheral road map. Specifically, a coordinate system of a position of an own vehicle is defined by, for example, setting a reference point of the node 352 which is the center point of the intersection as the origin and taking the east direction from the origin as the x-axis, the north direction from the origin as the y-axis, and the height direction from the origin as the z-axis. On the other hand, with respect to a line connecting the intersections each other such as the road link (351, 352), the coordinate system of the position of the own vehicle is defined by, for example, setting a start point (start point node) of a road link of interest as the origin and taking a direction along the advancing direction of the road link from the origin as the x-axis, a direction toward the outer direction of the road from the centerline of the road link as the y-axis, and the height direction from the origin as the z-axis. That is, according to the latter coordinate system, as illustrated in FIG. 2, a value of the x in position information of the position and posture of own vehicle 360 corresponds to a size of an offset 380 from the node 351. A value of the y corresponds to a size of an offset 381 from the centerline 394 of the road link (351, 352). A representation method of position information is not limited thereto and may be represented using, for example, a latitude and a longitude.

On the other hand, posture information of the position and posture of own vehicle 360 represents a direction toward the own vehicle. Specifically, for example, the posture information is represented by an angle when viewed in a clockwise direction with respect to true north. That is, as illustrated in FIG. 2, in a case where the own vehicle is directed toward true east, a value of posture information of the position and posture of own vehicle 360 becomes 90°. In the following description, although posture information is defined by regarding only a yaw angle which is a rotation angle in a horizontal surface as a target, the posture information may also be defined by regarding a roll angle and a pitch angle as targets.

In FIG. 2, the reference numerals 390 to 394 indicate information relating to an object such as a signboard on a road or paint on a road surface among information included in the peripheral road map data group 121. Specifically, as illustrated in FIG. 2, information relating to the road sign 390, the road surface paint 391, the stop line 392, the pedestrian crossing 393 and the centerline 394 are included in the peripheral road map data group 121. In the following description, it is assumed that a conspicuous thing of which a position is ascertained on such a road map or information of paint is referred to as land mark information. In the example of FIG. 2, although land mark information relating to road traffic, land mark information included in the peripheral road map data group 121 is not limited to the example of FIG. 2. For example, information relating to a conspicuous building in the vicinity of the road, or the like may be handled as land mark information. In the present invention, land mark information is used for the use of specifying the position and posture of own vehicle with high accuracy. Specifically, it is possible to specify the position and posture of own vehicle with high accuracy by collating a relative position relation of a land mark to the own vehicle in a real environment recognized by a camera, or the like and position information of the land mark stored in the peripheral road map data group 121.

In the storing unit 120 of the on-vehicle control device 10, information described as described above is stored in the peripheral road map data group 121.

FIG. 3 is a diagram illustrating an example of a data structure of a vehicle position and posture-related data group 122 in the storing unit 120 of the on-vehicle control device 10.

The vehicle position and posture-related data group 122 is aggregate of data indicating a position estimation result of the own vehicle and related information thereof. The vehicle position and posture-related data group 122, as illustrated in FIG. 3, is configured with a plurality of data records each of which is obtained by combining respective information of time 301, position and posture information 302, an cumulative distance 303, a position error in a longitudinal direction 304, a position error in a lateral direction 305, an angle error in advancing direction 306, and a positioning state flag 307.

In each data record of the vehicle position and posture-related data group 122, the time 301 indicates the information acquisition time and the position and posture information 302 indicates the position and posture of the own vehicle. The position and posture information 302 represents the road link corresponding to the position of own vehicle and the position and posture of the own vehicle using, for example, a combination of coordinate information and the road link by a representation form of the road map data described above. Specifically, it means that in an example of a data record #1 of FIG. 3, the own vehicle is positioned at a coordinate point indicated by a coordinate value of (x, y)=(100.0, 1.5) on the road link (351, 352) and is directed toward a 90.0° direction from north in the clockwise direction. Here, a unit of coordinate value of each of the x and y coordinates is, for example, a meter. In other words, it means that in this case, the own vehicle moves 100 meters along the road directing from the start point node 351 to the endpoint node 352 of the road link (351, 352) illustrated in FIG. 2 and travels a position, which is deviated outwardly from the road centerline by 1.5 meters, toward east.

The cumulative distance 303 indicates an accumulation value of the distance traveled by the own vehicle. For example, it is possible to easily calculate a traveling distance between two points by calculating a difference of the cumulative distance 303 in two data records. A calculation start point of the cumulative distance 303 is able to be arbitrarily set. For example, the calculation start point may also be sales time of the own vehicle or engine start-up of the own vehicle.

The position error in a longitudinal direction 304 indicates how much errors of the position of own vehicle specified by the position and posture information 302 includes in the longitudinal direction. Here, the longitudinal direction means, for example, a direction along a travel track recommended in travelling of the own vehicle. As described above, in a case of the position of own vehicle on the road link, a direction parallel to the advancing direction of the traveling road (traveling lane), that is, a direction along the x-axis of the coordinate system in the peripheral road map illustrated in FIG. 2 corresponds to the longitudinal direction. In other words, the position error in a longitudinal direction 304 represents an error of the x coordinate value represented by the position and posture information 302. On the other hand, also in the position of own vehicle within the intersection, although it is not explicit as in the case of the position of own vehicle on the road link, a track in which the vehicle should travel is determined when designing the road. In the present embodiment, it is assumed that a direction along the recommended travel track is meant to be definition of the longitudinal direction in the intersection. The recommended travel track of the own vehicle may be specified based on, for example, information acquired from the travel route determination device 80 and may be specified from the travel route information and shape information of intersection capable of being referenced from the peripheral road map data group 121.

The position error in a lateral direction 305 indicates how much errors the position of own vehicle specified by the position and posture information 302 includes in an orthogonal direction to the longitudinal direction described above. According to definition of the longitudinal direction described above, in a case where the position of own vehicle is present on the road link, the position error in a lateral direction 305 means an error in the direction orthogonal to the advancing direction of the traveling road (traveling lane) of the own vehicle, that is, a direction along the y-axis of the coordinate system in the peripheral road map illustrated in FIG. 2. In other words, the position error in a lateral direction 305 represents an error of the y coordinate value represented by the position and posture information 302. On the other hand, in a case where the position of own vehicle is located within the intersection, the position error in a lateral direction 305 means an error in the direction orthogonal to the recommended travel track described above.

In the present embodiment, although error information is represented by being divided into the longitudinal direction and the lateral direction, error information may be represented altogether, and may be represented by being divided into separate axes such as a latitude direction or a longitude direction.

The positioning state flag 307 is flag information representing whether a longitudinal direction position, a lateral direction position, and the advancing direction of the own vehicle are able to be positioned or not. For example, a positioning state flag 307 of the data record #1 is "(0, 1, 1)". This means that positioning is able to be made in the lateral direction position and the advancing direction while the longitudinal direction position is not able to be positioned. As a specific example, this means a situation in which the longitudinal direction position is estimated by integration of position and posture information in the past and a movement amount obtained from the vehicle sensor group 60 while a lateral position of the own vehicle and the advancing direction may be specified from a detection result of a white line on the road.

In the storing unit 120 of the on-vehicle control device 10, information as described above is stored in the vehicle position and posture-related data group 122.

FIG. 4 is a diagram illustrating an example of a data structure of the allowable position accuracy parameter data group 123 in the storing unit 120 of the on-vehicle control device 10.

The allowable position accuracy parameter data group 123 is aggregate of data indicating position and posture accuracy requested for a case where the travel control system 1 performs travel control of the own vehicle. The allowable position accuracy parameter data group 123, as illustrated in FIG. 4, is configured with a plurality of data records each of which is obtained by combining respective information of a travel control level 371, an environmental condition 372, an allowable error in a longitudinal direction 373, and an allowable error in a lateral direction 374.

In each data record of the allowable position accuracy parameter data group 123, the travel control level 371 indicates an operation mode relating to travel control of the own vehicle in a numerical value. Preferably, the numerical value of the travel control level 371 is set in such a way that control for which higher accuracy is requested as the numerical value becomes larger is executed, in response to the degree of difficulty of the operation mode. For example, in FIG. 4, control for supporting driving by a driver is defined as a level 1 (driving support control), a situation where the travel control system 1 controls driving of the own vehicle under monitoring by the driver is defined as a level 2 (semi-automatic driving), and a situation where the travel control system 1 controls driving of the own vehicle without being subjected to monitoring by the driver is defined as a level 3 (full automatic driving). Here, both the level 2 and the level 3 correspond to automatic driving by the travel control system. In the level 2, the driver is obligated to perform continuous monitoring and thus, it is possible to switch to driving (manual driving) by a driver relatively quickly in a situation where the continuation of automatic driving is difficult. In contrast, in the level 3, it is unclear in which state the driver is and thus, the difference is that it takes a time to switch to manual driving. The travel control level 371 does not need to be limited to definition thereof and any form is available as long as a travel control mode of own vehicle may be specified by the form.

The environmental condition 372 indicates an operation environment of the travel control mode indicated by the travel control level 371. Even in the case of the same travel control mode, position and posture accuracies required according to an environment may be different. For that reason, an operation environment of a target is designated by the environmental condition 372 so as to make it possible to enable requirements of the position and posture accuracy to be described under various environmental conditions. For example, although data records #1 and #2 represent requirements of the position and posture accuracy in the same travel control level of the "level 1 (acceleration and deceleration)", contents of the environmental condition 372 are different. This is because the request for precision of control is different between deceleration control in a high-speed region and deceleration control, which includes stopping in a low-speed region and thus, requested accuracies for the position and posture are different. The environmental condition is divided by description contents of the environmental condition 372 and the position and posture accuracies requested for respective divided environmental conditions are indicated.

The allowable error in a longitudinal direction 373 and the allowable error in a lateral direction 374 indicate position accuracies requested for an advancing direction and an orthogonal direction of the road, respectively. That is, the allowable error in a longitudinal direction 373 represents an allowable error for the value of the x coordinate represented by the position and posture information 302 and the allowable error in a lateral direction 374 represents an allowable error for the value of the y coordinate represented by the position and posture information 302. A case where the content of the allowable error in a longitudinal direction 373 or the allowable error in a lateral direction 374 is "N/A", as in the allowable error in a lateral direction 374 of the data records #1 and #2, represents that the requirements for position accuracy are not present with respect to each direction.

Subsequently, description will be made on operations of the travel control system 1 of the present embodiment. In the travel control system 1, the on-vehicle control device 10 executes travel control processing for determining the travel control content and outputting a target control value to the actuator group 70, as primary processing, based on a situation at the periphery of the own vehicle. A processing flow 400 illustrated in FIG. 5 is a flowchart of travel control processing executed by the on-vehicle control device 10 in the travel control system 1 of the present embodiment.

In Step S401, the on-vehicle control device 10 waits for a predetermined time. In this case, the on-vehicle control device 10 determines awaiting time based on a calculation trigger condition of the travel control content, which is determined in advance, for the travel control content determination unit 106. For example, the on-vehicle control device 10 may determine the waiting time by a trigger condition using a timer such that the calculation of the travel control content is conducted on every fixed time. The on-vehicle control device 10 may detect the necessity of recalculation of the travel control content and determine the waiting time by regarding the detection result as the trigger condition such that on-demand calculation of the travel control content may be conducted. After waiting for a predetermined time, the on-vehicle control device 10 proceeds to Step S402.

In Step S402, the on-vehicle control device 10 specifies various pieces of information needed for travel control processing. Here, information needed for specifying the position and posture of own vehicle in the vehicle position and posture specifying unit 102 or for determining the travel control content in the travel control content determination unit 106 is specified. For example, positioning information of own vehicle acquired from the own vehicle positioning device 40, various sensor information acquired from the external sensor group 50 or the vehicle sensor group 60, travel route information acquired from the travel route determination device 80, information relating to a peripheral road map of own vehicle acquired from the peripheral road map data group 121, and the like are specified as information needed for travel control processing. These pieces of information are acquired by the related information acquisition unit 101 of the on-vehicle control device 10 at an appropriate timing through a vehicle network, or the like and stored in the storing unit 120.

In Step S403, the on-vehicle control device 10 specifies the position and posture of own vehicle, that is, the position and posture of own vehicle. Here, the position and posture of own vehicle is specified by the vehicle position and posture specifying unit 102 of the on-vehicle control device 10 using positioning information, or the like acquired in Step S402.

In the following, a specific example of a position and posture of own vehicle specification method in Step S403 will be described. Firstly, the vehicle position and posture specifying unit 102 collates positioning information (for example, latitude, longitude, and advancing azimuth) acquired from the own vehicle positioning device 40 and the peripheral road map data group 121 to specify road on which the own vehicle is traveling. This corresponds to so-called map matching processing used in a navigation device, or the like.

Next, the vehicle position and posture specifying unit 102 collates land mark information around the traveling road acquired from the peripheral road map data group 121 with information relating to observation information (a type of a recognized land mark, a relative position, or the like) of the land mark acquired from the external sensor group 50. With this, a relative position relation between the own vehicle and the land mark is obtained and the position and posture of the own vehicle is specified.

For example, under the situation illustrated in FIG. 2, it is possible to obtain a relative position and a relative angle of the own vehicle to the road centerline 394 from the observation result of the road centerline 394 by the external sensor group 50. These values are collated with information of the road centerline 394 in the peripheral road map data group 121 to thereby make it possible to specify the lateral position (a value of the y coordinate) and the advancing direction of the own vehicle in the road link (351, 352). Specifically, for example, it is assumed that position of the own vehicle is deviated from the road centerline 394 by 2.0 m and the relative angle of the own vehicle in the advancing direction is 0°. In this case, position and posture information of the own vehicle can be specified as {road link (351, 352), X, 2.0, 90.0} by using a representation method of the position and posture in the vehicle position and posture-related data group 122 exemplified in FIG. 3. Here, a value of X is not decided yet. Furthermore, for example, it is assumed to be able to observe that the road sign 390 is located at a position represented by {road link (351, 352), 200.0, 6.0, 270.0}, and when viewed from the own vehicle, the road sign 390 is located at a position where a relative distance in the longitudinal direction is 50.0 m and a relative distance in the lateral direction is 4.0 m. In this case, the position and posture information of the own vehicle can be specified as {road link (351, 352), 150.0, 2.0, 90.0} by being combined with the coordinate value obtained from a recognition result of the road centerline 394.

On the other hand, a land mark which can be utilized when specifying the position and posture of the own vehicle as described above may not exist around the own vehicle. Even when such a land mark exists, the external sensor group 50 may not recognize the land mark. As such, the position and posture of own vehicle is not always specified using land mark information. In such a case, it is preferable that the position and posture of the own vehicle is estimated using another method, for example, odometry. Specifically, vehicle speed information and angular velocity information of the own vehicle, or information (for example, rotation angle information of a tire or vehicle speed pulse information, or the like instead of vehicle speed information) corresponding to the pieces of information are acquired from the vehicle sensor group 60 and these pieces of information are subjected to an integration operation to be added to the advancing direction and the position specified at the previous time. Also, with this, it is possible to estimate the current position and posture of the own vehicle.

A method for specifying the position and posture of own vehicle is not limited to the land mark observation or the odometry described above. For example, the position and posture may be corrected by receiving position information from a wireless communication device arranged on the side of a road or the position and posture may be corrected by using the high-accuracy GNSS.

In Step S403, the vehicle position and posture specifying unit 102 can specify the position and posture of own vehicle by using the method described above.

Subsequently, in Step S404, the on-vehicle control device 10 estimates an error (position and posture error) of the position and posture of own vehicle specified in Step S403. Here, the current position and posture error is estimated, by the vehicle position and posture error specifying unit 103 of the on-vehicle control device 10, based on the error included in positioning information acquired in Step S402.

In the following, a specific example of a position and posture error estimation method in Step S404 will be described. In Step S403 described above, in a case where the position and posture of own vehicle can be specified using observation information of the land mark, the position and posture error is calculated based on the error of observation information (for example, a relative distance of the recognized land mark) or the position error of the land mark in map information. On the other hand, in a case where the position and posture of own vehicle cannot be specified using observation information of the land mark, the position and posture error is calculated by accumulating the error of information from the vehicle sensor group 60 used in the odometry described above. That is, in this case, the position and posture of own vehicle is specified by performing the integration operation by using vehicle speed information and angular velocity information output from the vehicle sensor group 60 and thus, the errors included in the pieces of information are accumulated as position and posture errors. Specifically, it is assumed that, for example, positions of the own vehicle in the x-axis direction and the y-axis direction are respectively represented as the x(t) and the y(t) and the errors of the positions x(t) and y(t) are respectively the position errors $\Delta x(t)$ and $\Delta y(t)$ at the certain time t. It is assumed that an angle of the own vehicle with respect to the x-axis in the advancing direction is represented as a posture angle $\theta(t)$ and the error of the posture angle $\theta(t)$ is a posture error $\Delta\theta(t)$ at the time t. Furthermore, it is assumed that a vehicle speed and an angular velocity are respectively represented as v(t) and $\omega(t)$ and the error of the vehicle speed v(t) is a velocity error $\Delta v(t)$ and the error of the angular velocity $\omega(t)$ is an angular velocity error $\Delta\omega(t)$ at the time t. In this case, when it is assumed that the time of a time point after one sampling time $\Delta t$ has elapsed from the time t is $t+\Delta t$, it is known that the position and posture error at the time $t+\Delta t$ may be approximated by, for example, the following equations (1) to (3). Here, respective errors represented by the equations (1) to (3) are obtained as stochastic variables having a probabilistic distribution.

$$\Delta x(t+\Delta t)=\Delta x(t)+\{-v(t)\cdot\sin\theta(t)\cdot\Delta\theta(t)+\cos\theta(t)\cdot\Delta v(t)\}\cdot\Delta t \quad (1)$$

$$\Delta y(t+\Delta t)=\Delta y(t)+\{v(t)\cdot\cos\theta(t)\cdot\Delta\theta(t)+\sin\theta(t)\cdot\Delta v(t)\}\cdot\Delta t \quad (2)$$

$$\Delta\theta(t+\Delta t)=\Delta\theta(t)+\Delta\omega(t)\cdot\Delta t \quad (3)$$

By using the equations (1) to (3), it is possible to update variance of errors of position and posture information using statistical values of measurement errors of the vehicle speed and the angular velocity. When it is assumed that the x-axis described above is a direction along a recommended travel track, in a case where a position in the lateral direction can be corrected by lane recognition, or the like, it is possible to approximate $\theta(t)$, $\Delta\theta(t)$, and $\Delta y(t)$ to 0, respectively. For that reason, the equation (1) approximates to $\Delta x(t+\Delta t)=\Delta x(t)+\Delta v(t)\cdot\Delta t$. That is, the position and posture errors are accumulated with the lapse of time. On the other hand, as in an intersection, in a case where correction of the position in the lateral direction is difficult and a magnitude of the vehicle speed v(t) is a certain level, a second term of the equation (1), that is, $v(t)\cdot\Delta t\cdot\Delta\theta(t)$ obtained by rearranging the equation (1) becomes a dominant term. This nearly corresponds to a value obtained by adding the position error $\Delta\theta(t)$ to the traveled distance of the own vehicle from the time t to the time $t+\Delta t$. Accordingly, the position and posture errors are accumulated according to a cumulative distance that the own vehicle travels.

In Step S404, by the method as described above, the vehicle position and posture error specifying unit 103 can estimate the current position and posture error. The estimated position and posture error and the position and posture of own vehicle specified in Step S403 are stored in the vehicle position and posture-related data group 122 in a data format illustrated in FIG. 3.

Next, in Step S405, the on-vehicle control device 10 executes position and posture error transition estimation processing in order to estimate how the position and posture error will make transition in future. Here, position and posture error transition estimation processing is executed by the future travel content estimation unit 108 and the future position and posture error specifying unit 104 of the on-vehicle control device 10 according to a processing flow 450 illustrated in FIG. 6. With this, the error of the future position and posture of own vehicle is estimated by using the current position and posture errors specified in Step S404 as an initial value. Details of the processing flow 450 of FIG. 6 will be described later.

Next, in Step S406, the on-vehicle control device 10 executes suitable travel control level determination processing for determining a suitable travel control level in future travel control of the own vehicle. Here, the suitable travel control level determination processing is executed by the allowable position and posture error specifying unit 105, the travel control content determination unit 106, the future travel content estimation unit 108, and the driver state specifying unit 111 of the on-vehicle control device 10, according to a processing flow 500 illustrated in FIG. 7. With this, the suitable travel control level corresponding to a future travel control content of the own vehicle is determined based on the error of the future position and posture of own vehicle estimated in Step S405. Details of the processing flow 500 of FIG. 7 will be described later.

When processing of Step S406 is ended, in Step S407, the on-vehicle control device 10 executes traveling control continuity information notification processing for notifying a driver of information relating to continuity of travel control of the own vehicle, based on the suitable travel control level determined in Step S406. Here, traveling control continuity information notification processing is executed by the travel control continuity information determination unit 109 and the travel control continuity information output unit 110 of the on-vehicle control device 10, according to a processing flow 700 illustrated in FIG. 12. Details of the processing flow 700 of FIG. 12 will be described later.

When the information relating to continuity of travel control of the own vehicle is notified in Step S407, the on-vehicle control device 10 determines the travel control content of the own vehicle in Step S408. Here, information relating to an assumed travel route of the own vehicle is specified by the travel route information specifying unit 107 of the on-vehicle control device 10 with reference to the peripheral road map data group 121, based on information output from the travel route determination device 80. The information includes information relating to a road shape on the assumed travel route of the own vehicle. The travel control content of the own vehicle is determined by the travel control content determination unit 106 of the on-vehicle control device 10 based on information relating to the specified assumed travel route and the current travel control level. Specifically, for example, in a case where right and left turns and a curve are present, the travel control contents, such as steering control or acceleration and deceleration control, that are needed for automatically travelling on the right and left turns and the curve are determined based on the road shape on the assumed travel route.

In Step S409, the on-vehicle control device 10 computes a target control value needed for travel control of the own vehicle and outputs target control value to the actuator group 70 based on the travel control contents of the own vehicle determined in Step S408. When processing of Step S409 is executed, the on-vehicle control device 10 returns to Step S401 and repeats travel control processing according to the processing flow 400 of FIG. 5.

Next, details of position and posture error transition estimation processing executed in Step S405 of FIG. 5 will be described. FIG. 6 indicates the processing flow 450 of position and posture error transition estimation processing.

In Step S451, the future travel content estimation unit 108 acquires travel control plan information representing travel control content of the own vehicle. The travel control plan information is determined according to, for example, the travel control processing flow 400 of FIG. 5 based on the travel control content determined by the travel control content determination unit 106 in Step S408 of a processing cycle at the previous time. In travel control plan information, information representing a travel control content of the own vehicle at the time subsequent from the present time point, for example, information such as a target track or target speed profile indicating how to control the own vehicle is included.

In Step S452, the future travel content estimation unit 108 determines whether travel control plan information can be acquired in Step S451. In a case where travel control plan information of the own vehicle exists and the travel control plan information can be acquired in Step S451, the processing proceeds to Step S453. On the other hand, in a case where travel control plan information of the own vehicle does not exist and cannot be acquired, for example, in a case where travel control of the own vehicle is not conducted, the processing proceeds to Step S454.

In Step S453, the future travel content estimation unit 108 specifies the travel content of the own vehicle until to (to is an arbitrary value) second elapse based on the travel control plan information acquired in Step S451. Here, matters how the own vehicle travels on the assumed travel route is obtained according to the acquired travel control plan information. When processing of Step S453 is ended, the processing proceeds to Step S455.

On the other hand, in a case where the travel control plan information cannot be acquired in Step S451, the future travel content estimation unit 108 estimates the travel content of the own vehicle until to seconds elapse in Step S454. Here, by the travel route information specifying unit 107, information relating to the assumed travel route of the own vehicle is specified in a method similar to Step S408 of FIG. 5 and matters how the driver drives the own vehicle for to seconds from the present time point based on the specified information is estimated. As a traveling estimation method of the own vehicle, for example, it may also simply estimate that the own vehicle continues to travel at a constant velocity or acceleration. The travel control content is temporarily calculated such that the travel content of the own vehicle may be estimated using external information obtained from the peripheral road map data group 121 or the external sensor group 50, based on a road shape represented by information relating to the assumed travel route specified by the travel route information specifying unit 107. It is preferable that the value of the to is greater than the maximum value of a verification target time T which will be described later. When processing of Step S454 is ended, the processing proceeds to Step S455.

In Step S455, the future position and posture error specifying unit 104 estimates a position and posture error until to seconds elapse based on the travel content of the own vehicle specified in Step S453 or the travel content of the own vehicle estimated in Step S454. Here, the position and posture error in future, that is, to seconds later from the present time is estimated by adding position and posture errors accumulated for to seconds from the present time due to traveling of the own vehicle on the assumed travel route to the initial value, using the current position and posture error specified in Step S404 of FIG. 5 as an initial value.

In Step S455, the future position and posture error specifying unit 104, basically, calculates the worst value of the assumed position and posture error by taking the travel content of the own vehicle into account for to seconds from the present time point. In the simplest method, errors accumulated until to seconds elapse through the odometry are calculated by assuming a situation in which the position and posture cannot be specified with high-accuracy, for example, position estimation using landmark information. For example, an advancing direction, a speed, angular velocity, or the like is determined when the own vehicle travels the assumed travel route based on the travel control content represented by travel control plan information acquired in Step S451 or the travel control content temporarily calculated in Step S454 and the position and posture error until to seconds elapse is estimated using the position and posture error calculation equation described above.

It is preferable that the position and posture error is set for a point, for which the position and posture of own vehicle can be specified with high accuracy by land mark recognition, or the like, by taking specification accuracy of the position and posture of own vehicle at that point into account. For example, the calculation may be made in such a way that the position and posture errors are not accumulated while traveling a road section in which the lane is recognizable in a state where the position in the lateral direction can be estimated with high accuracy by recognizing a lane of the traveling road. Otherwise, a transition of the position and posture error may be estimated based on land mark information that exists on the road that the own vehicle will travel and the recognition probability for land mark information. For example, errors which are accumulated so far may be reset when passing through a site for which accurate position information can be received from a road infrastructure.

In a determination factor of variance values of the angular velocity error $\Delta\omega(t)$ or the velocity error $\Delta v(t)$ described above, a surrounding environment of the own vehicle is also included, in addition to a feature inherent in the vehicle sensor group 60, for example, a quantization error. For example, in a case where speed information is calculated from the number of revolutions, a slip ratio of the tire significantly influences the velocity error. The slip ratio of the tire is significantly influenced by a frictional resistance value of the road surface. For that reason, frictional resistance values of respective roads may be stored in the peripheral road map data group 121 and the frictional resistance values may be referenced to correct the variance value of the velocity errors in such a way that a higher variance value is set to a road as the frictional resistance value of the road is increased. The road surface state such as freeze, rain, snow, or the like may be recognized based on information obtained from the external sensor group 50 or the wireless communication unit 30 and a change in the frictional resistance value from the recognized result may be estimated to correct a variance value of the velocity errors.

Otherwise, in a case where information of a factor which changes a variance value of errors cannot be acquired like the frictional resistance value or the road surface state, correction using time-series data of error information is possible. For example, in a case where it is assumed that the position in the lateral direction can be corrected by lane recognition as described above, a position error in the x-axis direction is obtained as $\Delta x(t+\Delta t)=\Delta x(t)+\Delta v(t)\cdot \Delta t$ by respectively setting $\theta(t)$, $\Delta\theta(t)$, and $\Delta y(t)$ to 0 as described above to rearrange the equation (1). That is, the position error $\Delta x(t+\Delta t)$ is accumulated in a form in which the velocity error $\Delta v(t)$ is set as inclination and is proportional to the elapsed time $\Delta t$. On the other hand, in a case where the land mark is recognizable, the position and posture of own vehicle can be specified with a fixed high accuracy, irrespective of the elapsed time. For that reason, it is possible to measure how many position and posture errors are generated by the odometry by comparing the error of the position and posture of own vehicle in a case where land mark is recognized with the position and posture accuracy of own vehicle accuracy in a case where the position and posture of own vehicle is estimated by the odometry. It is possible to estimate the magnitude of the velocity error $\Delta v(t)$ by statistically obtaining the measurement results.

In Step S455, as described above, the future position and posture error specifying unit 104 estimates the position and posture error which includes the longitudinal direction of the own vehicle, that is, the position error $\Delta x(t+to)$ in the x-axis direction and the lateral direction of the own vehicle, that is, the position error $\Delta y(t+to)$ in the y-axis direction in future after a predetermined time to elapses from the present time t, based on the travel content of the own vehicle specified or estimated in Step S453 or S454. The position and posture error estimation method described above is an example. As long as it is possible to estimate the transition of position and posture error until at least to seconds elapse, the future position and posture error may be estimated by using any method.

When processing of Step S455 is executed, the future position and posture error specifying unit 104 ends position and posture error transition estimation processing illustrated in the processing flow 450 of FIG. 6. With this, processing of Step S405 of FIG. 5 is completed.

In the position and posture error transition estimation processing, as described above, the future travel content estimation unit 108 executes processing of Step S453 or S454 based on information relating to the assumed travel route of the own vehicle specified by the travel route information specifying unit 107 so as to specify or estimate the travel content of the own vehicle according to the road shape on the assumed travel routes. The future position and posture error specifying unit 104 estimates the position and posture error of processing of Step S455 based on the processing result. That is, the future position and posture error specifying unit 104 performs processing of Step S455 so as to make it possible to estimate the position and posture error according to the road shape on the assumed travel route based on information specified by the travel route information specifying unit 107.

Next, details of suitable travel control level determination processing executed in Step S406 of FIG. 5 will be described. FIG. 7 illustrates a processing flow 500 of the suitable travel control level determination processing.

In Step S501, the travel control content determination unit 106 acquires a travel control level Lc according to the current travel control content of the own vehicle.

In Step S502, the travel control content determination unit 106 sets an initial value of variables L and Lo based on the current travel control level Lc acquired in Step S501. Here, the current travel control level Lc acquired in Step S501 is set as the initial value of the variable L representing a travel control level being selected. The symbol φ which indicates an invalid value is set as the initial value of the variable Lo indicating a lapse of setting of the suitable travel control level.

In Step S503, the driver state specifying unit 111 specifies which state a driver of the own vehicle is in the current time and acquires the result. Here, for example, a state of a driver is detected based on an image obtained by capturing an expression, or the like of the driver by a camera or biological information (gaze, perspiration, pulse, body temperature, or the like) of the driver detected by various sensors. As a result, for example, which state the driver is in any of an awakening state, a dozing state, an attention-distracting state, and the like is identified. In a case where the state of the driver cannot be correctly detected or a case where a sensor for detecting the state of the driver is not mounted, a value indicating a detection-disabled state is acquired.

In Step S504, the travel control content determination unit 106 sets the future time T regarded as a verification target for the suitable travel control level based on the current value of the variable L and the state of the driver specified in Step S503. Here, it is preferable that a length of the verification target time T is set to be longer as a degree of driving-difficulty state of the state of the driver specified in Step S503 is increased. For example, in a case where the driver is in a dozing state, the time taken for awakening the driver needs to be secured. In a case where the driver is in an attention-distracting state, the time taken for calling a driver's attention needs to be secured. For that reason, in these states, a value of the verification target time T is set to be larger than other states. That is, in the example of the states of driver, for example, it is set in such a way that "verification target time T of an awakening state"<"verification target time T of an attention-distracting state"<"verification target time T of a dozing state". As such, the verification target time T for determining a suitable travel control level is determined based on the state of the driver of the own vehicle.

As described above, in a case where the state of the driver is the detection-disabled state, the verification target time T may be set similarly to, for example, the case of the dozing state. Furthermore, the value of the verification target time T may be changed based on the value of the variable L representing the travel control level being selected. For example, even when the state of the driver is the awakening state, in a case where the travel control level is 3, there is no monitoring obligation for automatic driving control of the own vehicle and thus, the driver may look out of the corner of his/her eye. For that reason, it is preferable that the value of the verification target time T is set to be larger as the travel control level is increased. It is preferable that the value of the verification target time T set in Step S504 is smaller than the future time to at which the estimation of the position and posture error in Step S455 of FIG. 6 is performed.

In Step S505, the future travel content estimation unit 108 specifies a future travel content of the own vehicle based on the verification target time T determined in Step S504. Here, the travel content of the own vehicle for a verification target time T from the present time is specified. The future travel content estimation unit 108 can specify the travel content of the own vehicle until T seconds elapse by the method similar to, for example, Steps S451 to S454 of FIG. 6. That is, the future travel content estimation unit 108 specifies the travel content of the own vehicle according to the road shape on the assumed travel route based on information relating to the assumed travel route of the own vehicle specified by the travel route information specifying unit 107. In this case, the travel content of the own vehicle may be included to specify at the time which is later than the verification target time T.

In Step S506, the allowable position and posture error specifying unit 105 specifies an allowable range (allowable position and posture error range) of the position and posture error of the own vehicle in future travel control, that is, requested accuracy of the position and posture of own vehicle based on the current value of the variable L, the value of the verification target time T which is set in Step S504, and the future travel content of the own vehicle specified in Step S505. Here, the allowable position and posture error specifying unit 105 references the allowable position accuracy parameter data group 123 illustrated in FIG. 4 to thereby specify the allowable position and posture error range according to a value of the travel control level represented by the variable L, regarding the travel content of the own vehicle in a period from the present time to a certain time point in future according to the verification target time T. Specifically, for example, it is assumed that the control level represented by the variable L is 3 and the travel content of the own vehicle in a period from the present time to the verification target time T later is a content indicating that the own vehicle turns right the intersection after traveling a straight course. In this case, allowable position errors in the longitudinal direction (x-axis direction) and the lateral direction (y-axis direction) at the time of traveling a straight course are obtained as 10 m and 0.5 m, respectively, by referencing a data record #21 of the allowable position accuracy parameter data group. Similarly, allowable position errors in the longitudinal direction (x-axis direction) and the lateral direction (y-axis direction) at the time of deceleration control before turning right the intersection are obtained as 2 m and 0.5 m, respectively, by referencing a data record #24 of the allowable position accuracy parameter data group. Also, allowable position errors in the longitudinal direction (x-axis direction) and the lateral direction (y-axis direction) at the time of turning right the intersection are obtained as 1 m and 0.5 m, respectively, by referencing a data record #25 of the allowable position accuracy parameter data group.

In Step S506, the allowable position and posture error specifying unit 105, as described above, specifies an allowable range of position and posture error including an allowable range of position error of the own vehicle in the longitudinal direction, that is, the x-axis direction, and an allowable range of position error of the own vehicle in the lateral direction, that is, the y-axis direction. In this case, the allowable position and posture error specifying unit 105 determines a data record to be referenced in the allowable position accuracy parameter data group 123 and specifies the allowable position and posture error range by taking the future travel content of the own vehicle specified in Step S505 according to the road shape on the assumed travel route into account. That is, the allowable position and posture error specifying unit 105 performs processing of Step S506 so as to make it possible to specify the allowable position and posture error range based on the road shape on the assumed travel route. The allowable position and posture error range may be specified regarding a time range which includes a future time point further later than the verification target time T.

In Step S507, the travel control content determination unit 106 compares the value of a period from the present time to the verification target time T among the position and posture errors estimated by the future position and posture error specifying unit 104 with the allowable position and posture error range in the travel control level according to the value of the variable L specified in Step S506. It is determined whether the position and posture error until the verification target time T seconds elapse is less than the allowable position and posture error range based on the comparison result. As a result, in a case where the position and posture error is less than the allowable position and posture error range all the time in a period of time from the present time to the verification target time T, the processing proceeds to Step S508. On the other hand, in a case where a time point, at which the position and posture error becomes greater than or equal to the allowable position and posture error range, exists in a period of time from the present time to the verification target time T, the processing proceeds to Step S511. The period of time for which the position and posture error and the allowable position and posture error range are compared with each other in Step S507 may not necessarily coincide with the verification target time T. For example, regarding a period of time from the present time to a time point further later than the verification target time T, a comparison of the position and posture error with the allowable position and posture error range may be performed to determine, based on the comparison result, whether the position and posture error is less than or equal to the allowable position and posture error range. In Step S507, the comparison of the position and posture error with the allowable position and posture error range may be performed using discrete values of respective errors. For example, the position and posture error, which is estimated by the future position and posture error specifying unit 104 at predetermined discrete times in a period from the present time to the verification target time T, is compared with the allowable position and posture error range at respective time points. It may be determined, based on the comparison result, whether the position and posture error is less than or equal to the allowable position and posture error range.

When processing proceeds from Step S507 to S508, in Step S508, the travel control content determination unit 106 substitutes the current value of the variable L into the variable Lo. That is, the value of the travel control level used when the allowable position and posture error range is specified in previous Step S506 is set as a suitable travel control level.

Subsequently, in Step S509, the travel control content determination unit 106 compares the value of the variable Lo set in Step S508 with the current travel control level Lc acquired in Step S501. As a result, in a case where the value of the variable Lo is less than the current travel control level Lc but the current travel control level Lc is a maximum value Lmax of the travel control level, suitable travel control level determination processing illustrated in the processing flow 500 of FIG. 7 is ended. That is, in a case where a relation of Lo<Lc or Lc=Lmax is established, the travel control level for which a confirmation whether requirements of the position and posture accuracy are satisfied or not is to be performed does not exist anymore and thus, the value of the variable Lo at that time is decided as the suitable travel control level of the own vehicle and the suitable travel control level determination processing is completed. On the other hand, in a case where the value of the variable Lo is less than or equal to the current travel control level Lc and the current travel control level Lc is less than the maximum value Lmax of the travel control level, the processing proceeds to Step S510. That is, in a case where a relation of Lc≤Lo<Lmax is established, there is a possibility that requirements of position and posture accuracy are satisfied in a higher travel control level and thus, the processing proceeds to Step S510 and suitable travel control level determination processing is continued.

In a case where processing proceeds from Step S509 to S510, in Step S510, the travel control content determination unit 106 adds 1 to the value of the variable L. That is, the value of the travel control level used when the allowable position and posture error range is specified in previous Step S506 is incremented by 1 so as to regard the higher travel control level as a processing target thereafter. When Step S510 is executed, processing returns to Step S503 and processing described above is repeated using the value of the variable L after being increased.

In a case where processing proceeds from Step S507 to S511, in Step S511, the travel control content determination unit 106 determines whether the current value of the variable Lo is φ, which indicates the invalid value as described above, or not. As a result, in a case of Lo=φ, that is, in a case where the value of the variable L0 is kept at the initial value, which is set in Step S502, it is necessary to continue and search the travel control level satisfying requirements of position and posture accuracy and thus, the processing proceeds to Step S512. On the other hand, in a case of Lo≠φ, that is, in a case where a certain value other than the initial value is already set in the variable Lo, the value of the variable Lo is decided as the suitable travel control level of the own vehicle and suitable travel control level determination processing illustrated in the processing flow 500 of FIG. 7 is ended.

In a case where processing proceeds from Step S511 to S512, in Step S512, the travel control content determination unit 106 determines whether the current value of the variable L is less than or equal to 1 or not. As a result, when the variable L is less than or equal to 1, the processing proceeds to Step S513. On the other hand, when the variable L is greater than 1, the processing proceeds to Step S514. That is, when the relation of L>1 is established, there is a possibility that in a lower travel control level, requirements of position and posture accuracy are satisfied and travel control obtained by degenerating the functionality can be executed and thus, the processing proceeds to Step S514 and suitable travel control level determination processing is continued.

In a case where processing proceeds from Step S512 to S513, in Step S513, the travel control content determination unit 106 sets the value of the variable Lo to 0. That is, the suitable travel control level is set to 0 such that the driver drives manually without performing automatic driving control. When Step S512 is executed, suitable travel control level determination processing illustrated in the processing flow 500 of FIG. 7 is ended.

On the other hand, in a case where processing proceeds from Step S512 to S514, in Step S514, the travel control content determination unit 106 decreases the value of the variable L by 1. That is, the value of the travel control level used when the allowable position and posture error range is specified in previous Step S506 is decremented by 1 so as to regard the lower travel control level as a processing target thereafter. When Step S514 is executed, processing returns to Step S503 and processing described above is repeated using the value of the variable L after being decreased.

As described above, suitable travel control level determination processing illustrated in the processing flow 500 of FIG. 7 is performed. As a result, the suitable travel control level corresponding to the future travel control content of the own vehicle is set by the travel control content determination unit 106.

In the following, contents of the suitable travel control level determination processing flow 500 described above will be described in detail using specific examples of travel scenes of the own vehicle illustrated in FIGS. 8 to 11. In the travel scenes of FIGS. 8 to 11, it is assumed that the road sign 390, the road surface paint 391, the stop line 392, and the pedestrian crossing 393 exist around the road on which the own vehicle is traveling, similar to the contents represented by the peripheral road map data group 121 exemplified in FIG. 2. In the following, for an easy-to-understand, description will be made by paying attention only to the position error of the own vehicle in the longitudinal direction, that is, the position error in the x-axis direction.

All of FIGS. 8 to 10 illustrate examples of the travel scenes in which the own vehicle travels a straight course and comes to turn right the intersection in a state of the travel control level Lc=3. For that reason, L=3 and Lo=φ are set at the time point in Step S502.

First, in the travel scene of FIG. 8, the state of the driver is specified in Step S503 and subsequently, the verification target time T is set based on the state of the driver in Step S504. Here, the set value of the verification target time T is represented as T1. Here, in Step S505, the travel track 550 of FIG. 8 and a travel speed profile of the own vehicle on the travel track 550 are specified as the travel contents of the own vehicle in a period from the present time until T1 seconds elapse. With this, an estimated position 572 of the own vehicle after T1 seconds is specified.

Next, in Step S506, an allowable position and posture error range corresponding to the travel control level L=3 is specified according to the value of the variable L. In this case, a transition of an environmental condition of the own vehicle is obtained as normal traveling→deceleration control before the intersection→turning right at the intersection, based on the travel track 550. In the allowable position accuracy parameter data group 123 of FIG. 4, data records corresponding to the transition of the environmental condition are data records #21, #24, and #25. Accordingly, the transition in the allowable error in a longitudinal direction is obtained as 10 m→2 m→1 m by referencing these data records. As a result, an allowable range of position error 561 is specified, as illustrated in FIG. 8 by a thick broken line.

In Step S507, an estimated value 560, which is estimated as being illustrated by a thin broken line, of a future position and posture error and the allowable range of position error 561 are compared, by the position and posture error transition estimation processing flow 450 of FIG. 6, based on the position and posture error history 563 to the present time. Here, in the travel scene of FIG. 8, it is assumed that the road sign 390 is recognized and accordingly, the value of the position and posture error history 563 is reduced as illustrated. For that reason, the estimated value 560 of the future position and posture error at that time becomes lower than the allowable range of position error 561 in the assumed travel range 562 for T1 seconds illustrated in FIG. 8. The assumed travel range 562 corresponds to a range from the current position 571 at which is x=x0 to the estimated position 572 after T1 seconds at which is x=x1. For that reason, the determination condition of Step S507 is satisfied and the processing proceeds to Step S508 and L=3 is set as the value of the variable Lo representing the suitable travel control level. Thereafter, in Step S509, when Lmax=3 is set, it is determined that the condition of Lc=Lmax is satisfied.

Accordingly, the suitable travel control level determination processing flow 500 is ended.

In the travel scene of FIG. 8, Lo=Lc=3 is set by processing as described above. This indicates that the continuation of the current travel control level is possible.

FIGS. 9 and 10 represent the travel scenes after a predetermined time has elapsed from FIG. 8, respectively. Even in these travel scenes, the state of the driver is specified in Step S503 and subsequently, the verification target time T is set based on the state of the driver in Step S504, similar to matters described in the travel scene of FIG. 8. Here, a value of the set verification target time T is represented as T2. Thereafter, the allowable range of position error 561 similar to FIG. 8 is specified in Step SS506 after the travel track 550 is specified and the estimated position of the own vehicle 622 after T2 seconds is specified in Step S505.

In the travel scene of FIG. 9, it is assumed that the road surface paint 391 is recognized and accordingly, the value of the position and posture error history 563 is further reduced as illustrated. For that reason, the estimated value 610 of the future position and posture error at that time becomes lower than the allowable range of position error 561 in the assumed travel range 612 for T2 seconds illustrated in FIG. 9, similar to the travel scene of FIG. 8. The assumed travel range 612 corresponds to a range from the current position 621 at which is x=x0 to the estimated position 622 after T2 seconds at which is x=x2. For that reason, also, in this case, the determination condition of Step S507 is satisfied and the processing proceeds to Step S508 and L=3 is set as the value of the variable Lo representing the suitable travel control level. Thereafter, the suitable travel control level determination processing flow 500 is ended and it is determined that the continuation of the current travel control level is possible.

On the other hand, in the travel scene of FIG. 10, it is assumed that the road surface paint 391 is unable to be recognized due to external environmental factors such as blurring of the road surface paint 391 or traffic congestion. In this case, as illustrated in FIG. 10, errors are accumulated such that the value of the position and posture error history 563 is increased after the road sign 390 becomes unrecognizable. Due to the influence, an estimated value of future position and posture error 660 at that time becomes larger than the allowable range of position error 561 after x=xc, in the assumed travel range 612. For that reason, in this case, the determination condition of Step S507 is not satisfied and the processing proceeds to Step S511.

Here, Lo=φ and L=3 are set and thus, processing proceeds from Steps S511 to S514 via S512. In Step S514, L=2 is set by decreasing 1 from L=3. Here, processing in and after Step S503 is executed again. A situation at that time is illustrated in the travel scene of FIG. 11.

In the travel scene of FIG. 11, L=2 is set such that a verification target time T3 shorter than the verification target time T2 in a case of L=3 is newly set in Step S504. Thereafter, the travel track 550 is specified and an estimated position of the own vehicle 691 after T3 seconds is specified in Step S505, and then, an allowable position and posture error range 661 corresponding to the travel control level L=2 is newly specified in Step SS506. Here, according to the allowable position accuracy parameter data group 123 of FIG. 4, values of the allowable error in a longitudinal direction in a case of L=2 illustrated in data records #11, #14, and #15 are the same as the values in a case of L=3. Accordingly, as illustrated in FIG. 11, the same value as the allowable range of position error 561 of FIGS. 8 to 10 is set in an allowable position and posture error range 661.

Thereafter, in Step S507, the estimated value of future position and posture error 660 is compared with the allowable range of position error 661 specified in Step S506. The estimated value of future position and posture error 660 becomes lower than the allowable range of position error 661 in the assumed travel range 690 for T3 seconds illustrated in FIG. 11. The assumed travel range 690 corresponds to a range from the current position 621 at which x=x0 to the estimated position 691 after T3 seconds at which x=x3. For that reason, in this case, the determination condition of Step S507 is satisfied and the processing proceeds to Step S508 and L=2 is set as the value of the variable Lo representing the suitable travel control level. Thereafter, the suitable travel control level determination processing flow 500 is ended. It is determined that continuation of the current travel control level is possible.

In the travel scene of FIG. 11, Lo=2 is set by processing as described above. Here, Lc=3 and thus, Lo<Lc. This indicates that the continuation of the current travel control level is not possible and the travel control level needs to be decremented.

As described above, in the suitable travel control level determination processing flow 500, the position and posture error in the verification target time T is compared with an allowable position and posture error (requested position and posture accuracy) of a target travel control level after the verification target time T is specified according to the state of the driver or the current travel control level. With this, it is possible to determine that the continuation of the current travel control level is possible. The processing flow 500 illustrated in FIG. 7 is a flow indicated by generalizing such suitable travel control level determination processing and may calculate a suitable travel control level representing the maximum travel control level that withstands the transition of future position and posture errors. That is, processing is performed according to the processing flow 500 of FIG. 7 so as to make it possible to determine the extent to which the travel control level is to be deteriorated or the extent to which the travel control level can be recovered, as well as whether the continuation of the current travel control level is possible.

Next, details of traveling control continuity information notification processing executed in Step S407 of FIG. 5 will be described. FIG. 12 illustrates a processing flow 700 of traveling control continuity information notification processing.

In Step S701, the travel control continuity information determination unit 109 generates travel control continuity information for notifying the on-vehicle display device 20 of continuity of travel control of the own vehicle. Here, the travel control continuity information determination unit 109 generates travel control continuity information based on the value of the suitable travel control level determined when the suitable travel control level determination processing described above is executed by the travel control content determination unit 106 in Step S406 of FIG. 5. As described in the processing flow 500 of FIG. 7, the travel control content determination unit 106 determines the suitable travel control level based on the future position and posture error estimated by the future position and posture error specifying unit 104. The future position and posture error is estimated based on the current position and posture error estimated by the vehicle position and posture error specifying unit 103. That is, in Step S701, the travel control continuity information determination unit 109 determines travel control continuity information to be generated based on the position and posture error estimated by the vehicle position and posture error specifying unit 103.

In Step S702, the travel control continuity information output unit 110 outputs travel control continuity information generated in Step S701 to the on-vehicle display device 20. Here, the travel control continuity information output unit 110 generates a message based on travel control continuity information and outputs the message to the on-vehicle display device 20. With this, travel control continuity information is transmitted from the on-vehicle control device 10 to the on-vehicle display device 20.

FIG. 13 is a diagram illustrating an example of a travel control continuity information message format transmitted in Step S702 of FIG. 12. A format 750 of travel control continuity information message illustrated in FIG. 13 includes a current travel control level 751, a suitable travel control level 752, and a travel control continuation-possible-time 753. In FIG. 13, header information relating to a communication protocol, or the like is omitted.

The current travel control level 751 is a portion storing information which represents a level of a travel control mode which is being executed at present by the on-vehicle control device 10. The suitable travel control level 752 is a portion storing information which represents the suitable travel control level specified by suitable travel control level determination processing executed in Step S406 of FIG. 5. The travel control continuation-possible-time 753 is a portion storing a value which represents how long the current travel control level can be kept. The value of the travel control continuation-possible-time 753 can be computed by calculating a time taken for the own vehicle to reach a position (for example, position corresponding to x=xc of FIG. 10), at which the allowable position and posture error range intersects with the estimated value of the future position and posture error, from the current position, for example, in suitable travel control level determination processing of Step S406.

Description will be referred back to FIG. 12. In Step S721, the on-vehicle display device 20 receives the travel control continuity information message transmitted from the on-vehicle control device 10 in Step S702 by the travel control continuity information acquisition unit 201. A content of the message according to the format 750 exemplified in FIG. 13 is analyzed and various pieces of information are acquired.

In Step S722, the on-vehicle display device 20 performs travel control continuity information display processing for displaying information acquired in Step S721 on the screen input and output unit 240 by the HMI output control unit 202.

In Step S723, the on-vehicle display device 20 compares the current travel control level represented by travel control continuity information acquired in Step S721 with the suitable travel control level by the HMI output control unit 202 to thereby determine whether the continuation of the travel control mode being executed at present is possible or not. As a result, when the suitable travel control level is equal to the current travel control level, it is determined that the continuation of the travel control mode being executed at present is possible and traveling control continuity information notification processing illustrated in the processing flow 700 of FIG. 12 is ended. On the other hand, when the suitable travel control level is different from the current travel control level, it is determined that the continuation of the travel control mode being executed at present is not possible and the processing proceeds to Step S724. In this case, procedure processing (session) for changing the travel control level needs to be executed for the driver.

In the on-vehicle display device 20 of the present embodiment, although in Step S723, the current travel control level is compared with the suitable travel control level to determine continuity of travel control, continuity of travel control may be determined by a method other than that. For example, a configuration in which a message including information which indicates a determination result of continuity of travel control by the on-vehicle control device 10 is transmitted from the on-vehicle control device 10 to the on-vehicle display device 20 and the determination is made based on the information may be adopted.

In Step S724, the on-vehicle display device 20 determines whether the session is generated or not. When it is generated, traveling control continuity information notification processing illustrated in the processing flow 700 of FIG. 12 is ended and when it is not generated, the processing proceeds to Step S725.

In Step S725, the on-vehicle display device 20 generates a session for changing the travel control level based on travel control continuity information acquired in Step S721, by the HMI output control unit 202.

In Step S726, the on-vehicle display device 20 performs session processing for notifying the driver of change of the travel control level using the session generated in Step S725, by the HMI output control unit 202. Here, a predetermined session screen is displayed on the screen input and output unit 240 so as to notify the driver of change of the travel control level.

FIG. 14 is a diagram illustrating an example of a display screen of travel control continuity information displayed on the screen input and output unit 240 of the on-vehicle display device 20 in session processing executed in Step S726 of FIG. 12. The screen is displayed by being corresponded to the travel scene exemplified in FIG. 10. The screen illustrated in FIG. 14 includes a travel control mode display 801, a travel control stability display 802, a notification content display 803, a navigation information display 804, and a position and posture error display 805.

The travel control mode display 801 indicates a travel control mode at the present time. In the travel scene of FIG. 10, the travel control level is 3 (steering+acceleration and deceleration+no driver monitoring). For that reason, the expression of "full-automatic driving mode" is described in the travel control mode display 801. A display content of the travel control mode display 801 is not limited to the example of FIG. 14 as long as it is possible for the driver to identify the current travel control mode. For example, it may be represented by an icon, which typically expresses the travel control mode, or the like.

The travel control stability display 802 indicates stability of the current travel control mode. Here, for example, stability may be expressed in a six-step level (0 to 5). In the example of FIG. 14, matters that stability is level 2 are represented. The level of stability is calculated based on information acquired from the on-vehicle control device 10. For example, the level of stability is calculated based on a value of the travel control continuation-possible-time 753 in the travel control continuity information message format 750 illustrated in FIG. 13 and the transition request time of the travel control mode. Specifically, for example, it is assumed that a value of the verification target time T2 described above is 30 seconds when transitioning from the full-automatic driving mode (travel control level 3) to the semi-automatic driving mode (travel control level 2). In this case, it is determined that when the travel control continuation-possible-time is 0 to 10 seconds, stability is the level 0, when the travel control continuation-possible-time is 10 to 20 seconds, stability is the level 1, and when the travel control continuation-possible-time is 20 to 30 seconds, stability is the level 2. As such, it is preferable that the level of stability becomes higher as the travel control continuation-possible-time is increased. Thus, it is possible to present information of suitable stability to the driver based on requirements requested for the notification of change of the travel control mode, compared to a case where what level of the position estimation accuracy is simply indicated.

The notification content display 803 indicates notification contents with respect to the driver. FIG. 14 illustrates a screen example at the time of start-up of the session when the travel control level makes a transition from 3 to 2. For that reason, the expression of "Please make transition to semi-automatic driving mode" is described in the notification content display 803. The notification content display 803 is a display for attracting driver's attention. For that reason, it is desirable that in the on-vehicle display device 20, the notification content display portion 803 is displayed and the same content is output using a voice or a notifying sound to call an attention is output by the voice input and output unit 250.

The navigation information display 804 indicates a road map around the own vehicle and indicates a position on the map or a travel route of the own vehicle. The display content of the navigation information display 804 corresponds to a display screen of a general navigation system. In the example of FIG. 14, the position of the own vehicle is indicated by an own vehicle position mark 810 on the road map. A travel route of the own vehicle is indicated and lines 811, 812, and 813 different from each other are displayed on the travel route so as to indicate the transition of continuity of travel control. The solid line 811 indicates a range for which it is confirmed that the current travel control mode is capable of being continued. The shaded line 812 displays a range having a possibility that the current travel control mode cannot be continued. The broken line 813 displays a range in which continuity of the travel control mode is not yet determined. The navigation information display 804 includes an icon 814 indicating an end point of a continuation range and a time period during which the current travel control mode can continue. By the icon 814, the continuation-possible-time of the current travel control mode is visualized. With this, it is possible to allow a user (driver) to recognize an additional time and an additional distance until switching of the current travel control mode. The icon 814 may be displayed in a case where switching of the travel control mode is not needed. In this case, the icon 814 is displayed so as to make it possible to indicate stability of the current travel control.

The position and posture error display 805 indicates external world recognition information around the own vehicle, and indicates the position and posture error or the nearest travel track of the own vehicle. In the position and posture error display 805, a vehicle mark 820 represents the own vehicle, a broken line area 821 represents a range (for example, a value of 2σ) of the position and posture error, and an arrow line 822 represents a travel track of the own vehicle.

In FIG. 14, an example of a notification screen relating to the transition of the travel control mode displayed at the time of start-up of session is illustrated. Other screens displayed during session processing are not illustrated. In actual session processing, the on-vehicle display device 20 displays the notification screen as in FIG. 14 and starts a procedure for transitioning to the semi-automatic driving mode between itself and the driver. For example, in a case where the driver performs a predetermined operation on the notification screen or the driver responded to the voice, the session is established in order to recognize whether the driver confirmed the notification content or not. When it is intended to transit to the semi-automatic driving mode, it is necessary to confirm that the driver monitors automatic travel control of the own vehicle by the travel control system 1. For that reason, for example, in a case where the state of a driver is detected using, for example, the camera and the sensor and it is confirmed, for more than a fixed time, that the driver looks ahead of the vehicle in an awakening state, based on the detection result, the session is ended.

As described above, according to the present embodiment, the on-vehicle control device 10 of the own vehicle estimates the future position and posture error by taking parameter inherent to the sensor and an environment of the traveling road as well as the position and posture error at the present time point into account and determines whether the continuation of the current travel control level is possible. For that reason, it is possible to accurately determine the need for switching of the travel control level. Accordingly, it becomes possible to suppress unnecessary switching of the travel control level or an erroneous notification and thus, it is possible to reduce any sense that a driver feels.

According to the present embodiment, the on-vehicle control device 10 of the own vehicle further performs estimation of the future position and posture error according to assumed behavior of the own vehicle using travel control plan information (target travel track or target speed profile) determined by the travel control system. For that reason, it is possible to improve estimation accuracy of the future position and posture error. With this, it becomes possible to suppress unnecessary switching of the travel control level or an erroneous notification and thus, it is possible to reduce any sense that a driver feels.

According to the present embodiment, the on-vehicle control device 10 of the own vehicle sets the requested position and posture accuracy used in the determination of the need for switching of the travel control level by taking the type of travel control or the environment of the traveling road into account. For that reason, similar to the above description, it is possible to further improve determination accuracy and it is possible to reduce any sense that a driver feels.

According to the present embodiment, the on-vehicle control device 10 of the own vehicle dynamically determines a time period during which the current travel control level needs to be kept to the minimum, that is, the time regarded as the verification target, according to the content of a changing procedure of the travel control level regarded as a target or the state of a driver. With this, it is possible to notify with high accuracy and by securing the time sufficient for the transition of the control level to and thus, possible to reduce any sense that a driver feels.

According to the first embodiment of the present invention described above, the following effects are exhibited.

(1) The on-vehicle control device 10 is mounted on an own vehicle and controls traveling of the own vehicle. The on-vehicle control device 10 includes the vehicle position error specifying unit 103 that estimates a position error of the own vehicle, the travel control continuity information determination unit 109 that determines information relating to continuity of the travel control state of the own vehicle based on the position error of the own vehicle estimated by the vehicle position error specifying unit 103 and the travel control continuity information output unit 110 that outputs the information relating to the continuity of the travel control state of the own vehicle determined by the travel control continuity information determination unit 109. Thus, in a case where the position estimation accuracy of the own vehicle is deteriorated, it is possible to perform a notification relating to continuity of automatic driving with high accuracy and sufficiently beforehand.

(2) The on-vehicle control device 10 further includes the future position and posture error specifying unit 104 that estimates the future position error of the own vehicle based on the position error of the own vehicle estimated by the vehicle position error specifying unit 103. The travel control continuity information determination unit 109 determines the information relating to the continuity of the travel control state of the own vehicle based on the future position error estimated by the future position and posture error specifying unit 104. Thus, it is possible to suitably perform the notification relating to continuity of automatic driving by taking the future position error of the own vehicle into account.

(3) The on-vehicle control device 10 further includes the allowable position error specifying unit 105 that determines an allowable range of a position error in future travel control of the own vehicle. The travel control continuity information determination unit 109 determines the information relating to the continuity of the travel control state of the own vehicle based on a comparison result of the future position error estimated by the future position and posture error specifying unit 104 and the allowable range of the position error determined by the allowable position error specifying unit 105. Specifically, the future position and posture error specifying unit 104 estimates the position error in a longitudinal direction that represents the future position error in the x-axis direction which is a direction parallel to the advancing direction of the traveling road of the own vehicle and the position error in a lateral direction that represents the future position error in the y-axis direction which is a direction orthogonal to the advancing direction of the traveling road (Step S455). The allowable position and posture error specifying unit 105 determines the allowable error in a longitudinal direction that represents the allowable range of position error in the x-axis direction which is a direction parallel to the advancing direction of the traveling road of the own vehicle and the allowable error in a lateral direction that represents the allowable range of position error in the y-axis direction which is a direction orthogonal to the advancing direction of the traveling road of the vehicle (Step S506). The travel control content determination unit 106 compares the position error in a longitudinal direction and/or position error in a lateral direction estimated by the future position and posture error specifying unit 104 with the allowable error in a longitudinal direction and/or the allowable error in a lateral direction determined by the allowable position and posture error specifying unit 105 (Step S507), and determines the suitable travel control level based on the comparison result (Steps S508 to S514). The travel control continuity information determination unit 109 determines information relating to continuity of the travel control state of the own vehicle based on the suitable travel control level determined based on the comparison result in the travel control content determination unit 106 (Step S701). Thus, it is possible to reliably determine information relating to continuity of the travel control state of the vehicle of the own vehicle with high accuracy and accurately perform the notification relating to continuity of automatic driving based on the information.

(4) The on-vehicle control device 10 further includes the travel route information specifying unit 107 that specifies information relating to the assumed travel route of the own vehicle. The future position and posture error specifying unit 104 estimates the future position error of the own vehicle based on information relating to the assumed travel route specified by the travel route information specifying unit 107 (Steps S451 to S455). The information relating to the assumed travel route includes information relating to the road shape on the assumed travel route. The allowable position error specifying unit 105 may determine the allowable range of the position error based on the road shape on the assumed travel route represented by the information. Thus, it is possible to accurately estimate the future position error of the own vehicle and accurately determine the allowable range of position error of the own vehicle by taking a surrounding environment in the road on which the own vehicle is scheduled to travel thereafter into account.

(5) The on-vehicle control device 10 further includes the travel control content determination unit 106 that determines the travel control content of the vehicle. The future position and posture error specifying unit 104 estimates a future position error of the own vehicle based on the travel control content of the own vehicle determined by the travel control content determination unit 106 (Step S455). The allowable position and posture error specifying unit 105 determines the allowable range of the position error based on the travel control content of the own vehicle determined by the travel control content determination unit 106 (Step S506). Thus, it is possible to accurately estimate the future position error of the own vehicle according to the travel control content of the own vehicle which is scheduled in the future and accurately determine the allowable range of position error of the own vehicle.

(6) The allowable position and posture error specifying unit 105 sets a value of the variable L so as to select any one of travel control levels from a plurality of travel control levels which are set in advance according to the travel control content of the own vehicle (Steps S502, S510, and S514) and determines the allowable range of the position error based on the selected travel control level (Step S506). The travel control content determination unit 106 compares the future position error estimated by the future position and posture error specifying unit 104 with the allowable range of position error determined by the allowable position and posture error specifying unit 105 (Step S507) and sets a value of the variable Lo based on the comparison result so as to set any one of the travel control levels from the plurality of travel control levels as the suitable travel control level corresponding to the future travel control content of the own vehicle (Steps S508 and S513). The travel control continuity information determination unit 109 determines information relating to the continuity of the travel control state of the own vehicle based on the suitable travel control level set by the travel control content determination unit 106 (Step S701). Thus, it is possible to accurately and readily determine information relating to continuity of the travel control according to a state of the travel control of the own vehicle.

(7) The on-vehicle control device 10 further includes the driver state specifying unit 111 that estimates the state of a driver of the own vehicle. The allowable position and posture error specifying unit 105 determines the allowable range of the position error based on the verification target time T determined according to the state of a driver of the own vehicle estimated by the driver state specifying unit 111 (Step S504). Thus, it is possible to suitably set the allowable range of position error based on a value of the verification target time T determined according to the state of a driver.

(8) The on-vehicle display device 20 mounted on the own vehicle includes the travel control continuity information acquisition unit 201 that acquires information relating to continuity of the travel control state of the own vehicle and the screen input and output unit 240 that displays information including travel control continuation-possible-time of the own vehicle at the present time on a screen, for example, the screen illustrated in FIG. 14, based on information acquired by the travel control continuity information acquisition unit 201. Thus, it is possible to perform the notification relating to continuity of automatic driving in the form easy for a driver to understand.

Second Embodiment

Next, a travel control system of a second embodiment of the present invention will be described. In the first embodiment, a configuration of the travel control system in which the on-vehicle control device 10 acquires the position and posture subjected to positioning using the GNSS, or the like from the own vehicle positioning device 40 and the position and posture of the own vehicle is specified, by using the land mark recognition or the odometry, with high accuracy was described. In contrast, in the following second embodiment, a configuration of a travel control system which uses a device replacing the own vehicle positioning device 40 of the first embodiment and specifying the position and posture of the own vehicle using the land mark recognition or the odometry will be described.

FIG. 15 is a functional block diagram illustrating an example of a configuration of a travel control system 1A according to a second embodiment of the present invention. In the travel control system 1A of the present embodiment, a difference between the travel control system 1A and the travel control system 1 of the first embodiment illustrated in FIG. 1 is that an own vehicle position and posture specifying device 90 which replaces the own vehicle positioning device 40 is included and some of functionalities of the on-vehicle control device 10 are transferred to the own vehicle position and posture specifying device 90 to form the on-vehicle control device 10A. Other functional configurations are equivalent to those of the travel control system 1 of the first embodiment. For that reason, in the following, description will be made only on the configuration related to the own vehicle position and posture specifying device 90 and a difference between the on-vehicle control device 10A and the on-vehicle control device 10.

The own vehicle position and posture specifying device 90 in the present embodiment, similar to the vehicle position and posture specifying unit 102 of the first embodiment, is a device that specifies the geographical position and posture of the own vehicle and provides information thereof to the on-vehicle control device 10A. The own vehicle position and posture specifying device 90 includes a processing unit 900, a storing unit 920, and a communication unit 930.

The processing unit 900 is configured to include, for example, a CPU or a memory such as a RAM. The processing unit 900 includes a related information acquisition unit 901, a vehicle position and posture specifying unit 902, a vehicle position and posture error specifying unit 903, a future position and posture error specifying unit 904, and a vehicle position and posture data output unit 905, as portions for realizing the functionalities of the own vehicle position and posture specifying device 90. The processing unit 900 executes a predetermined operation program stored in the storing unit 920 so as to make it possible to perform processing corresponding to the respective units.

The related information acquisition unit 901 is a portion that acquires various pieces of information (positioning information, periphery land mark information, external world recognition information, vehicle sensor information, or the like) needed when specifying the position and posture of the own vehicle and corresponds to some of functionalities of the own vehicle positioning device 40 and functionalities of the related information acquisition unit 101 of FIG. 1. The vehicle position and posture specifying unit 902 is a portion that specifies the position and posture of the own vehicle based on information obtained by the related information acquisition unit 901 and corresponds to the vehicle position and posture specifying unit 102 of FIG. 1. The vehicle position and posture error specifying unit 903 is a portion that estimates an error of the position and posture of the own vehicle specified by the vehicle position and posture specifying unit 902 and corresponds to the vehicle position and posture error specifying unit 103 of FIG. 1. The future position and posture error specifying unit 904 is a portion that estimates a future position and posture error of the own vehicle and corresponds to the future position and posture error specifying unit 104 of FIG. 1. The vehicle position and posture data output unit 905 is a portion that outputs information related to the positions and postures of the own vehicle and errors thereof which are respectively specified by the vehicle position and posture specifying unit 902, the vehicle position and posture error specifying unit 903, and the future position and posture error specifying unit 904 to the on-vehicle control device 10A using the communication unit 930.

The storing unit 920 is configured to include various storage devices, similar to the storing unit 120 of the on-vehicle control device 10A or the storing unit 220 of the on-vehicle display device 20. The storing unit 920 stores the program executed by the processing unit 900 and various data groups needed for realizing the present system. In the present embodiment, information of each of the peripheral road map data group 921 and the vehicle-position and posture-related data group 922 is stored in the storing unit 920, especially, as information for realizing the functionality of the own vehicle position and posture specifying device 90.

The peripheral road map data group 921 is aggregate of digital road map data relating to the road around the own vehicle needed for determining the position and posture or the travel control content of the own vehicle and corresponds to the peripheral road map data group 121 of FIG. 1. The vehicle-position and posture-related data group 922 is aggregate of data indicating a specification result of the position and posture of the own vehicle and information related thereto and corresponds to the vehicle position and posture-related data group 122 of FIG. 1. Specific contents of the data groups are similar to each of the peripheral road map data group 121 and the vehicle position and posture-related data group 122 described in the first embodiment and thus, description thereof will be omitted in the present embodiment.

The on-vehicle control device 10A includes a processing unit 100A, a storing unit 120, and a communication unit 130. The storing unit 120 and the communication unit 130 are the same as the storing unit 120 and the communication unit 130 of FIG. 1, respectively, and thus, description thereof will be omitted.

The processing unit 100A is configured to include, for example, the CPU and the memory such as the RAM, similar to the processing unit 100 of FIG. 1. The processing unit 100A includes the related information acquisition unit 101, the vehicle position and posture data acquisition unit 112, the allowable position and posture error specifying unit 105, the travel control content determination unit 106, the travel route information specifying unit 107, the future travel content estimation unit 108, the travel control continuity information determination unit 109, the travel control continuity information output unit 110, and the driver state specifying unit 111, as portions for realizing functionalities of the on-vehicle control device 10A. Among these units, the related information acquisition unit 101, the allowable position and posture error specifying unit 105, the travel control content determination unit 106, the travel route information specifying unit 107, the future travel content estimation unit 108, the travel control continuity information determination unit 109, the travel control continuity information output unit 110, and the driver state specifying unit 111 are the same as those described in the first embodiment, respectively. The processing unit 100A executes a predetermined operation program stored in the storing unit 120 so as to make it possible to perform processing corresponding to the respective units.

In the on-vehicle control device 10A of the present embodiment, some of functionalities of the on-vehicle control device 10 described in the first embodiment are transferred to the own vehicle position and posture specifying device 90. Specifically, the vehicle position and posture specifying unit 102, the vehicle position and posture error specifying unit 103, and the future position and posture error specifying unit 104 of FIG. 1 are transferred to the own vehicle position and posture specifying device 90 as the vehicle position and posture specifying unit 902, the vehicle position and posture error specifying unit 903, and the future position and posture error specifying unit 904, respectively. Some of functionalities of the related information acquisition unit 101 are transferred to the own vehicle position and posture specifying device 90, as the related information acquisition unit 901.

The on-vehicle control device 10A of the present embodiment needs to acquire data related to the position and posture of the own vehicle specified by the own vehicle position and posture specifying device 90 through the in-vehicle network, or the like. For that reason, the processing unit 100A of the on-vehicle control device 10A includes the vehicle position and posture data acquisition unit 112. The vehicle position and posture data acquisition unit 112 is a portion that acquires information which relates to the position and posture of the own vehicle and the error thereof that are output from the vehicle position and posture data output unit 905 of the own vehicle position and posture specifying device 90 using the communication unit 130. The allowable position and posture error specifying unit 105 and the travel control content determination unit 106 execute respective processing based on information acquired by the vehicle position and posture data acquisition unit 112, respectively.

In the travel control system 1A of the present embodiment, vehicle position and posture specification processing for specifying the position and posture of the own vehicle and the error thereof by the own vehicle position and posture specifying device 90 and notifying the position and posture and error thereof to the on-vehicle control device 10A is executed. A processing flow 1000 illustrated in FIG. 16 is a flowchart of vehicle position and posture specification processing executed in the travel control system 1A of the present embodiment.

In Steps S1001 to S1005, the own vehicle position and posture specifying device 90 performs processing which is respectively similar to processing of Steps S401 to S405 of FIG. 5. That is, after waiting for a predetermined time in Step S1001, positioning information needed for specifying the position and posture of the own vehicle, or the like are acquired by the related information acquisition unit 901 in Step S1002. In Step S1003, the current position and posture of own vehicle is specified by the vehicle position and posture specifying unit 902 based on information acquired in Step S1002. In Step S1004, the error of the current position and posture of own vehicle specified in Step S1003 is estimated by the vehicle position and posture error specifying unit 903. In Step S1005, an error of the future position and posture of own vehicle is estimated by the future position and posture error specifying unit 904 based on the error of the current position and posture of own vehicle estimated in Step S1004.

In Step S1006, the own vehicle position and posture specifying device 90 outputs own vehicle position and posture-related information for notifying the position and posture of the own vehicle and the error thereof to the on-vehicle control device 10A, based on the current position and posture of own vehicle specified in Step S1003, the error of the current position and posture of own vehicle estimated in Step S1004, and the error of the future position and posture of own vehicle estimated in Step S1005. Here, a message of the own vehicle position and posture-related information is generated and output to the on-vehicle control device 10A, by the vehicle position and posture data output unit 905 of the own vehicle position and posture specifying device 90, based on the result of processing of Steps S1003 to S1005. With this, own vehicle position and posture-related information is transmitted from the own vehicle position and posture specifying device 90 to the on-vehicle control device 10A.

FIG. 17 is a diagram illustrating an example of an own vehicle position and posture-related information message format transmitted in Step S1006 of FIG. 16. An own vehicle position and posture-related information message format 1050 illustrated in FIG. 17 includes position and posture information 1051, position and posture error information 1052, and the future position and posture error information 1053. In FIG. 17, header information relating to a communication protocol, or the like is omitted.

The position and posture information 1051 is a portion that stores information relating to the position and posture of the own vehicle specified by the own vehicle position and posture specifying device 90. Values of the position and posture information 1051 include, for example, position information such as a latitude, a longitude, or an azimuth in a geographical coordinate system or position information on the road of the own vehicle described in the first embodiment.

The position and posture error information 1052 is a portion that stores information relating to the error of the position and posture of the own vehicle represented by the position and posture information 1051. The position and posture error information 1052 includes, for example, standard deviation of the errors of latitudes, longitudes, and directions or standard deviation of the errors with respect to the recommended travel tracks in the longitudinal direction and the lateral direction.

The future position and posture error information 1053 is a portion that stores information relating to the future transition of the position and posture error of the own vehicle represented by the position and posture error information 1052, that is, a transition of a future position and posture error of the own vehicle. The future position and posture error information 1053 is represented by, for example, a list of the future position and posture errors per a unit time step (for example, after 1 second, after 2 seconds, . . . ). When it is possible to represent information relating to the future position and posture error, representation form of the future position and posture error information 1053 is not limited to matters described above. The future position and posture error information 1053 may be represented by a list of the future position and posture errors per a unit distance step (for example, 10 m ahead, 20 m ahead) or per a particular point (for example, curve starting point and intersection entry point) at which error behavior changes. The parameter (for example, an increased error amount per a unit time and increased error amount per a unit distance) used in the estimation of the error transition by the on-vehicle control device 10A may be used as the future position and posture error information 1053.

It may be configured in such a way that the future position and posture error information 1053 is not included in the own vehicle position and posture-related information message. In this case, the own vehicle position and posture specifying device 90 outputs own vehicle position and posture-related information including only the position and posture information 1051 and position and posture error information 1052 to the on-vehicle control device 10A in time series. In the on-vehicle control device 10A, an error transition of the position and posture of own vehicle is predicted based on time-series data of the information and continuity of travel control is determined by the travel control content determination unit 106 and the travel control continuity information determination unit 109 to thereby make it possible to determine travel control continuity information to be output to the on-vehicle display device 20. As described above, the position error in the x-axis direction (longitudinal direction) is generally increased in the form being proportional to the elapsed time by using a velocity measurement error as an inclination. For that reason, it becomes possible to calculate the future position and posture error by inversely calculating the inclination from time-series data of the position and posture error.

Description will be referred back to FIG. 16. In Step S1021, the on-vehicle control device 10A receives the own vehicle position and posture-related information message, which is transmitted from the own vehicle position and posture specifying device 90 in Step S1006, by the vehicle position and posture data acquisition unit 112. The message content is analyzed according to the format 1050 exemplified in FIG. 17 and various pieces of information are acquired.

In Step S1022, the on-vehicle control device 10A stores information acquired in Step S1021 in the vehicle position and posture-related data group 122. Here, stored data related to a vehicle position is used for travel control processing in the on-vehicle control device 10A. When processing of Step S1022 is executed, the on-vehicle control device 10A ends vehicle position and posture specification processing illustrated in the processing flow 1000 of FIG. 16.

Next, travel control processing executed in the travel control system 1A of the present embodiment will be described. A processing flow 1100 illustrated in FIG. 18 is a flowchart of travel control processing executed by the on-vehicle control device 10A in the travel control system 1A of the present embodiment.

In Steps S401 and S402, the on-vehicle control device 10A performs processing which is respectively similar to processing of Steps S401 and S402 of FIG. 5. That is, after waiting for a predetermined time in Step S401, information needed for determining the travel control content of the own vehicle is specified by the related information acquisition unit 101 in Step S402.

In Step S411, the on-vehicle control device 10A specifies own vehicle position and posture-related information transmitted from the own vehicle position and posture specifying device 90 by the vehicle position and posture specification processing described above. Here, in Step S1022 of FIG. 16, information stored in the vehicle position and posture-related data group 122 is acquired so as to specify the own vehicle position and posture-related information.

In Steps S406 to S409, the on-vehicle control device 10A performs processing which is respectively similar to processing of Steps S406 to S409 of FIG. 5 based on own vehicle position and posture-related information specified in Step S411. That is, in Step S406, suitable travel control level determination processing is executed, by the allowable position and posture error specifying unit 105, the travel control content determination unit 106, the future travel content estimation unit 108, and the driver state specifying unit 111, according to the processing flow 500 of FIG. 7 so as to determine the suitable travel control level corresponding to the future travel control content of the own vehicle. In this case, in Step S507 of FIG. 7, the estimated value of the position and posture error in a period from the present time to the verification target time T is acquired based on own vehicle position and posture-related information specified in Step S411 and is compared with the allowable position and posture error range. In Step S407, traveling control continuity information notification processing is executed according to the processing flow 700 of FIG. 12 by the travel control continuity information determination unit 109 and the travel control continuity information output unit 110 so as to notify the driver of information relating to continuity of travel control of the own vehicle. In Step S408, the travel control content of the own vehicle is determined by the travel control content determination unit 106. In Step S409, value needed for travel control of the own vehicle is computed based on the travel control content of the own vehicle determined in Step S408 and the target control value is output to the actuator group 70.

As described above, the future position and posture error information 1053 may not be included in the own vehicle position and posture-related information message transmitted from the own vehicle position and posture specifying device 90. In this case, in Step S406, it is preferable that time-series data of the position and posture of own vehicle and the error thereof is acquired based on own vehicle position and posture-related information specified in Step S411 and a transition of the future position and posture error is predicted from the time-series data. For example, in a case where time-series data illustrated in the vehicle position and posture-related data group 122 of FIG. 3 is acquired, when paying attention to the position error in a longitudinal direction 304, it may be observed that a position error in the longitudinal direction is increased in a rate of 0.02 m per second. With this, it becomes possible to estimate that for example, the position error in a longitudinal direction after t seconds is increased by 0.02×t meters from the present time point.

In Step S412, the on-vehicle control device 10A outputs the travel control content determined in Step S408 to the own vehicle position and posture specifying device 90. Here, travel control plan information relating to the travel control content is transmitted to the own vehicle position and posture specifying device 90 using the communication unit 130. In the present embodiment, as described above, the own vehicle position and posture specifying device 90 executes vehicle position and posture specification processing according to the processing flow 1000 of FIG. 16 so as to estimate the error of the future position and posture of own vehicle. In this case, the travel control content of the own vehicle is acquired so as to make it possible to estimate the error of the future position and posture of own vehicle with high accuracy. For that reason, processing of Step S412 is executed so as to transmit travel control plan information relating to the travel control content determined by the on-vehicle control device 10A from the on-vehicle control device 10A to the own vehicle position and posture specifying device 90. In the travel control plan information, for example, information such as the target track or the target speed profile is included. Travel control plan information transmitted from the on-vehicle control device 10A is delivered to the own vehicle position and posture specifying device 90 by a predetermined message format through the vehicle network. Travel control plan information received by the own vehicle position and posture specifying device 90 is stored in the storing unit 920. With this, the own vehicle position and posture specifying device 90 can acquire travel control plan information in Step S451 of FIG. 6 and improve error estimation accuracy of the future position and posture of own vehicle using the travel control plan information.

As described above, according to the present embodiment, it is possible to realize effects similar to those described in the first embodiment using the travel control system LA having the configuration illustrated in FIG. 15. That is, it becomes possible to suppress unnecessary switching of the travel control level or an erroneous notification and thus, it is possible to reduce any sense that a driver feels.

According to the second embodiment of the present invention described above, the following effects are further exhibited in addition to the effects (1) to (8) described in the first embodiment.

(9) The own vehicle position and posture specifying device 90 further includes a vehicle position and posture specifying unit 902 that estimates the position and posture of the own vehicle, a future position and posture error specifying unit 904 that estimate the future position error and the future posture error of the own vehicle, and a vehicle position and posture data output unit 905 that outputs a message including information relating to the position and posture of the own vehicle estimated by the vehicle position and posture specifying unit 902 and information relating to the future position error and the future posture error of the own vehicle estimated by the future position and posture error specifying unit 904. Thus, it is possible to simplify the configuration of the on-vehicle control device 10A compared to the on-vehicle control device 10 of the first embodiment.

(10) The travel control continuity information determination unit 109 of the on-vehicle control device 10A can determine information relating to continuity of the travel control state of the vehicle of the own vehicle based on time-series data of the position error of the own vehicle which is output from the own vehicle position and posture specifying device 90. Thus, even in a case where information relating to the future position error and the future posture error of the own vehicle is not transmitted from the own vehicle position and posture specifying device 90, it is possible to estimate the future position error of the own vehicle with high accuracy and suitably perform the notification of continuity of automatic driving in the on-vehicle control device 10A.

Each of the embodiments described above is an example and the present invention is not limited thereto. That is, various adaptations may be made thereto and all embodied embodiments are included in a scope of the present invention.

For example, in the embodiments described above, each processing of the on-vehicle control device and the on-vehicle display device is realized by executing a predetermined operation program using the processor and the RAM, but may be realized by specific hardware as needed. The on-vehicle control device, the on-vehicle display device, the wireless communication unit, the own vehicle positioning device, the own vehicle position and posture specifying device, the external sensor group, the vehicle sensor group, the actuator group, the travel route determination device, and the like are described as separate devices in the embodiments described above, but arbitrary one of them may also combine two or more elements as needed.

In a case where the processor executes the predetermined operation program to thereby realize each processing described above, information such as an operation program, a table, or a file that realize each processing may be stored in a storage device such as anon-volatile semiconductor memory, a hard disk drive, a solid state drive (SSD), or a computer readable non-temporary data storage medium such as an IC card, an SD card, or a DVD.

In respective figures, control lines and information lines considered necessary to describe the embodiments are illustrated, but the lines do not necessarily indicate all control lines and information lines included in an actual product to which the present invention is adapted. It may be considered that actually, almost all constituents are connected to each other.

Respective embodiments and various modification examples described above are just examples and the present invention is not limited to contents of those embodiments and examples unless characteristics of an invention are damaged. The present invention is not limited to the embodiments and modification examples described above and various changes may be made without departing from the spirit of the present invention.

Contents of the following application from which priority is claimed are incorporated herein by reference.

Japanese Patent Application No. 2015-5314 (filed on Jan. 14, 2015)

REFERENCE SIGNS LIST

1, 1A: travel control system
10, 10A: on-vehicle control device
20: on-vehicle display device
30: wireless communication unit
40: own vehicle positioning device
50: external sensor group
60: vehicle sensor group
70: actuator group
80: travel route determination device
90: own vehicle position and posture specifying device
100, 100A: processing unit
101: related information acquisition unit
102: vehicle position and posture specifying unit
103: vehicle position and posture error specifying unit
104: future position and posture error specifying unit
105: allowable position and posture error specifying unit 106: travel control content determination unit
107: travel route information specifying unit
108: future travel content estimation unit
109: travel control continuity information determination unit
110: travel control continuity information output unit
111: driver state specifying unit
120: storing unit
121: peripheral road map data group
122: vehicle-position and posture-related data group
123: allowable position accuracy parameter data group
130: communication unit
200: processing unit
201: travel control continuity information acquisition unit
202: HMI output control unit
220: storing unit
230: communication unit
240: screen input and output unit
250: voice input and output unit
900: processing unit
901: related information acquisition unit
902: vehicle position and posture specifying unit
903: vehicle position and posture error specifying unit
904: future position and posture error specifying unit
905: vehicle position and posture data output unit
920: storing unit
921: peripheral road map data group
922: vehicle-position and posture-related data group
930: communication unit

The invention claimed is:

1. An on-vehicle control device that is mounted on a vehicle to control traveling of the vehicle, the device comprising:
a vehicle position error specifying unit, implemented by a processor, that estimates a position error of the vehicle;
a travel control continuity information determination unit, implemented by a processor, that determines information relating to continuity of a travel control state of the vehicle based on the position error of the vehicle estimated by the vehicle position error specifying unit;
a travel control continuity information output unit, implemented by a processor, that outputs the information relating to the continuity of the travel control state of the vehicle determined by the travel control continuity information determination unit; and
a future position error specifying unit, implemented by a processor, that estimates a future position error of the vehicle based on the position error of the vehicle estimated by the vehicle position error specifying unit,
wherein the travel control continuity information determination unit determines the information relating to the continuity of the travel control state of the vehicle based on the future position error estimated by the future position error specifying unit.

2. The on-vehicle control device according to claim 1, wherein the travel control continuity information determination unit determines information relating to the continuity of the travel control state of the vehicle based on time-series data of the position error of the vehicle.

3. The on-vehicle control device according to claim 1, further comprising:
an allowable position error specifying unit that determines an allowable range of a position error in future travel control of the vehicle,
wherein the travel control continuity information determination unit determines the information relating to the continuity of the travel control state of the vehicle based on a comparison result of the future position error estimated by the future position error specifying unit and the allowable range of the position error determined by the allowable position error specifying unit.

4. The on-vehicle control device according to claim 3, wherein the future position error specifying unit estimates a position error in a longitudinal direction that represents the future position error in a direction parallel to an advancing direction of a travelling road of the vehicle and a position error in a lateral direction that represents the future position error in a direction orthogonal to the advancing direction of the travelling road,
the allowable position error specifying unit determines an allowable error in a longitudinal direction that represents the allowable range of the position error in the direction parallel to the advancing direction of the travelling road of the vehicle and an allowable error in a lateral direction that represents the allowable range of the position error in the direction orthogonal to the advancing direction of the travelling road of the vehicle, and
the travel control continuity information determination unit determines information relating to the continuity of the travel control state of the vehicle based on a comparison result of the position error in a longitudinal direction and/or the position error in a lateral direction estimated by the future position error specifying unit and the allowable error in a longitudinal direction and/or the allowable error in a lateral direction determined by the allowable position error specifying unit.

5. The on-vehicle control device according to claim 1, further comprising:
a travel route information specifying unit that specifies information relating to an assumed travel route of the vehicle,
wherein the future position error specifying unit estimates the future position error of the vehicle based on the information relating to the assumed travel route specified by the travel route information specifying unit.

6. The on-vehicle control device according to claim 5, wherein the information relating to the assumed travel route includes information relating to a road shape on the assumed travel route, and
the allowable position error specifying unit determines the allowable range of the position error based on the road shape on the assumed travel route.

7. The on-vehicle control device according to claim 1, further comprising:
a travel control content determination unit that determines a travel control content of the vehicle,
wherein the future position error specifying unit estimates a future position error of the vehicle based on the travel control content of the vehicle determined by the travel control content determination unit.

8. The on-vehicle control device according to claim 3, further comprising:
a travel control content determination unit that determines a travel control content of the vehicle,
wherein the allowable position error specifying unit determines the allowable range of the position error based on the travel control content of the vehicle determined by the travel control content determination unit.

9. The on-vehicle control device according to claim 8, wherein the allowable position error specifying unit selects any one of travel control levels from among a plurality of travel control levels which are set in advance according to the travel control content of the vehicle and determines the allowable range of the position error based on the selected travel control level, the travel control content determination unit sets any one of the travel control levels from among the plurality of the travel control levels as a suitable travel control level corresponding to a future travel control content of the vehicle, based on a comparison result of the future position error estimated by the future position error specifying unit and the allowable range of the position error determined by the allowable position error specifying unit, and the travel control continuity information determination unit determines information relating to the continuity of the travel control state of the vehicle based on the suitable travel control level set by the travel control content determination unit.

10. The on-vehicle control device according to claim 3, further comprising:

a driver state specifying unit that estimates a state of a driver of the vehicle, wherein the allowable position error specifying unit determines the allowable range of the position error based on a verification target time determined according to the state of the driver of the vehicle estimated by the driver state specifying unit.

11. An own vehicle position and posture specifying device, comprising:

a vehicle position and posture specifying unit, implemented by a processor, that estimates a position and a posture of a vehicle;

a future position and posture error specifying unit, implemented by a processor, that estimates a future position error and a future posture error of the vehicle;

a vehicle position and posture data output unit, implemented by a processor, that outputs a message including information relating to the position and posture of the vehicle estimated by the vehicle position and posture specifying unit and information relating to the future position error and future posture error of the vehicle estimated by the future position and posture error specifying unit; and a travel control continuity information determination unit, implemented by a processor, that determines the information relating to the continuity of the travel control state of the vehicle based on the future position error and future posture error of the vehicle estimated by the future position and posture error specifying unit.

12. An on-vehicle display device that is mounted on a vehicle, comprising:

a travel control continuity information acquisition unit, implemented by a processor, that acquires information relating to continuity of a travel control state of the vehicle;

a screen input and output unit that displays information including travel control continuation-possible-time of the vehicle at the present time on a screen based on information acquired by the travel control continuity information acquisition unit; and a travel control stability display, implemented by a processor, that displays stability of a current travel control mode, wherein the stability is determined based on the travel control continuation-possible-time in a travel control continuity information message and a transition request time of the travel control mode, wherein the screen input and output unit displays a travel route of the vehicle including a range of travel with the current travel control mode and a range outside of travel with the current travel control mode, based upon the continuation-possible-time.

* * * * *